US011503024B2

(12) United States Patent
Chapman et al.

(10) Patent No.: US 11,503,024 B2
(45) Date of Patent: Nov. 15, 2022

(54) PHYSICAL-LAYER IDENTIFICATION OF CONTROLLER AREA NETWORK TRANSMITTERS

(71) Applicant: The MITRE Coporation, McLean, VA (US)

(72) Inventors: Joseph Chapman, Chelmsford, MA (US); Hristos N. Giannopoulos, Woburn, MA (US); Alexander Wyglinski, West Boylston, MA (US)

(73) Assignee: The MITRE Corporation, McLean, VA (US)

( * ) Notice: Subject to any disclaimer, the term of this patent is extended or adjusted under 35 U.S.C. 154(b) by 408 days.

(21) Appl. No.: 16/706,165

(22) Filed: Dec. 6, 2019

(65) Prior Publication Data

US 2021/0176246 A1 Jun. 10, 2021

(51) Int. Cl.
| | |
|---|---|
| G06F 21/64 | (2013.01) |
| G06F 21/45 | (2013.01) |
| H04L 9/40 | (2022.01) |
| H04L 12/40 | (2006.01) |
| H04L 7/10 | (2006.01) |
| H04L 7/033 | (2006.01) |

(52) U.S. Cl.
CPC .... *H04L 63/0876* (2013.01); *H04L 12/40013* (2013.01)

(58) Field of Classification Search
CPC ........... H04L 63/0876; H04L 12/40013; H04L 29/12849; H04L 61/6027; H04L 2012/40215; H04W 4/46; H04W 4/48
See application file for complete search history.

(56) References Cited

U.S. PATENT DOCUMENTS 9,606,948 B2 3/2017 Monroe et al.
10,729,351 B1 * 8/2020 Chen ................... A61B 5/7267
(Continued)

FOREIGN PATENT DOCUMENTS

WO 2018/168291 9/2018

OTHER PUBLICATIONS

A FlexRay Transceiver Design with Bus Guardian for In-car Networking Systems Compliant with FlexRay Standard. Wang. Springer. (Year: 2013).*
(Continued)

*Primary Examiner* — Venkat Perungavoor
(74) *Attorney, Agent, or Firm* — Morrison & Foerster LLP

(57) ABSTRACT

Provided herein are systems and methods for authenticating controlled area network (CAN) transmissions using physical layer characteristics. In one or more examples, a device that is configured to authenticate CAN transmissions can be connected to an existing CAN. The device can be configured to undergo a training phase in which average transition waveforms of one or more electronic control units (ECUs) are created. When the device is in operation, each CAN transmission received by the device can be compared against the average transition waveforms to determine the ECU that is most likely to have sent the transmission. In one or more examples, the identified most likely ECU can be compared against the ECU identified by an arbitration ID of the transmission. If there is a mismatch then in one or more examples the device can alert to the possibility of a suspicious ECU transmission.

30 Claims, 12 Drawing Sheets

(56) References Cited

U.S. PATENT DOCUMENTS

| | | | | |
|---|---|---|---|---|
| 2002/0188888 | A1* | 12/2002 | Rivoir | H04L 25/493 |
| | | | | 714/25 |
| 2007/0011506 | A1* | 1/2007 | Yoshida | G01R 31/31703 |
| | | | | 714/712 |
| 2007/0091991 | A1* | 4/2007 | Sartschev | G01R 31/318357 |
| | | | | 375/224 |
| 2012/0051241 | A1* | 3/2012 | Mori | H04L 12/12 |
| | | | | 370/252 |
| 2013/0076451 | A1* | 3/2013 | Kelling | H04L 7/033 |
| | | | | 331/44 |
| 2015/0033016 | A1 | 1/2015 | Thornton et al. | |
| 2017/0262400 | A1 | 9/2017 | Hartwich et al. | |
| 2019/0058614 | A1* | 2/2019 | de Haas | H04L 69/18 |
| 2019/0104149 | A1 | 4/2019 | Zeng et al. | |
| 2021/0176246 | A1* | 6/2021 | Chapman | H04L 12/40013 |
| 2021/0374777 | A1* | 12/2021 | Schwerin | G06Q 30/0203 |

OTHER PUBLICATIONS

A Filtering Concept for Improving the Angle-based Forwarding Scheme in Vehicular Ad-hoc Network Communications. Kristiana. IJECE. (Year: 2016).*

Security Challenges, Authentication, Application and Trust Models for Vehicular Ad Hoc Network—A Survey. Vaibhav. (Year: 2017).*

Reciprocity Enhancement in V2V Key Generation System by using HPK Method. Dewi. IEEE. (Year: 2019).*

Choi et al. (Jul. 2016). "Identifying ECUs Using Inimitable Characteristics of Signals in Controller Area Networks" pp. 1-12.

"CAN Technical Overview" Motorola; 48 pages.

* cited by examiner

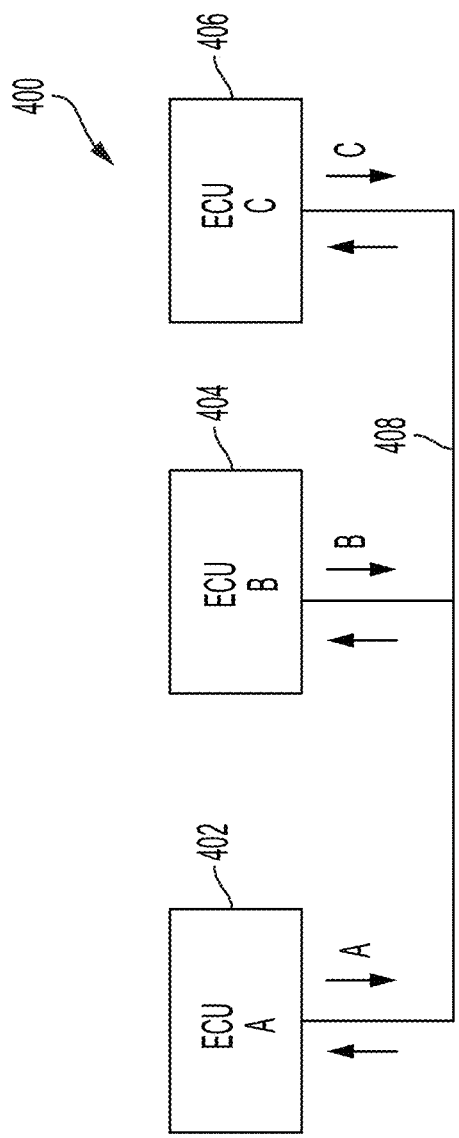

PHYSICAL-LAYER IDENTIFICATION OF CONTROLLER AREA NETWORK TRANSMITTERS

FIELD

The present disclosure relates generally to the Controller Area Network (CAN) standard and more specifically to systems and methods for identifying and authenticating Electronic Control Units within a controller area network system.

BACKGROUND

Modern automobiles include numerous and technologically complex systems that control the operation of the vehicle and provide the user with a safe and comfortable ride. In one or more examples, the systems can include such features as anti-lock braking, entertainment systems, climate control systems, etc. Often these systems may be required to communicate with one another as well as communicate with a central computer that can coordinate the activities of all of the various systems.

Modern automobiles, in one or more examples, can be controlled by many Electronic Control Units (ECUs) that communicate with each other in an in-vehicle communication system. Before the most widely used automotive bus standard, Controller Area Network (CAN), emerged, wiring between ECUs were point to point, which resulted in complex and expensive wiring configurations. CAN, which is a broadcast network connecting multiple ECUs, vastly reduced the wiring complexities and provides real-time, high-speed communications between ECUs.

However, the CAN standard lacks provisions for authentication and confidentiality, which allows any ECU connected to a CAN bus to transmit any properly formed CAN message. As a result, a compromised ECU can transmit spoofed and malicious messages on the CAN bus. Moreover, due to the broadcast nature of the CAN bus, a single compromised ECU can simultaneously affect multiple ECUs in the CAN network.

Various schemes have been proposed to introduce cryptographic elements within the CAN message to provide CAN message authentication. One scheme adds a cryptographic Message Authentication Code within a CAN message at the Application layer (layer 7) to allow each ECU to authenticate that CAN message. This approach, however, introduces significant communication overhead onto the CAN bus as the amount of ECU data that each CAN message can transmit is reduced. Another variant of introducing cryptographic elements replaces an error-detecting code, e.g., a cyclic redundancy code (CRC), in a CAN message with a cryptographically Message Authentication Code, e.g., a cryptographic CRC, at the link layer (layer 2) in hardware. While this variant does not introduce significant communication overhead, this variant requires each CAN controller within respective ECUs to be modified because cryptographic CRCs are not implemented in the CAN standard and therefore standard CAN controllers lack the functionality to process such cryptographic CRCs.

Therefore, there is a need for systems and methods that can secure CAN communications without requiring costly modifications to pre-existing ECUs or require significant communication overhead onto the CAN bus.

SUMMARY

As explained above, the CAN standard lacks provisions for authentication and as a result exposes a CAN network to cyber-attacks, such as spoofed messages. Known methods for CAN message authentication introduce cryptographic elements within a CAN message, which either increases communication overhead or requires a complete redesign of hardware elements within the CAN network. Therefore, improved techniques for CAN bus security are needed without the drawbacks mentioned above. Accordingly, disclosed herein are systems and methods for securing CAN communications. In one or more examples, a device can be included as part of the CAN that includes a classifier. The device can extract one or more signaling characteristics of a signal put onto the CAN by a specific ECU in the CAN. The device can also include classifier that can be trained to identify which ECU in the CAN a specific signals likely originated from based on the extracted one or more signaling characteristics. The device can then use the results from the classifier to make a determination as to whether the CAN message under analysis is authentic or has been likely sent by a malicious user or entity.

BRIEF DESCRIPTION OF THE DRAWINGS

FIG. 4a illustrates an exemplary messaging scheme for a CAN bus according to examples of the disclosure.

DETAILED DESCRIPTION

Figure 1:
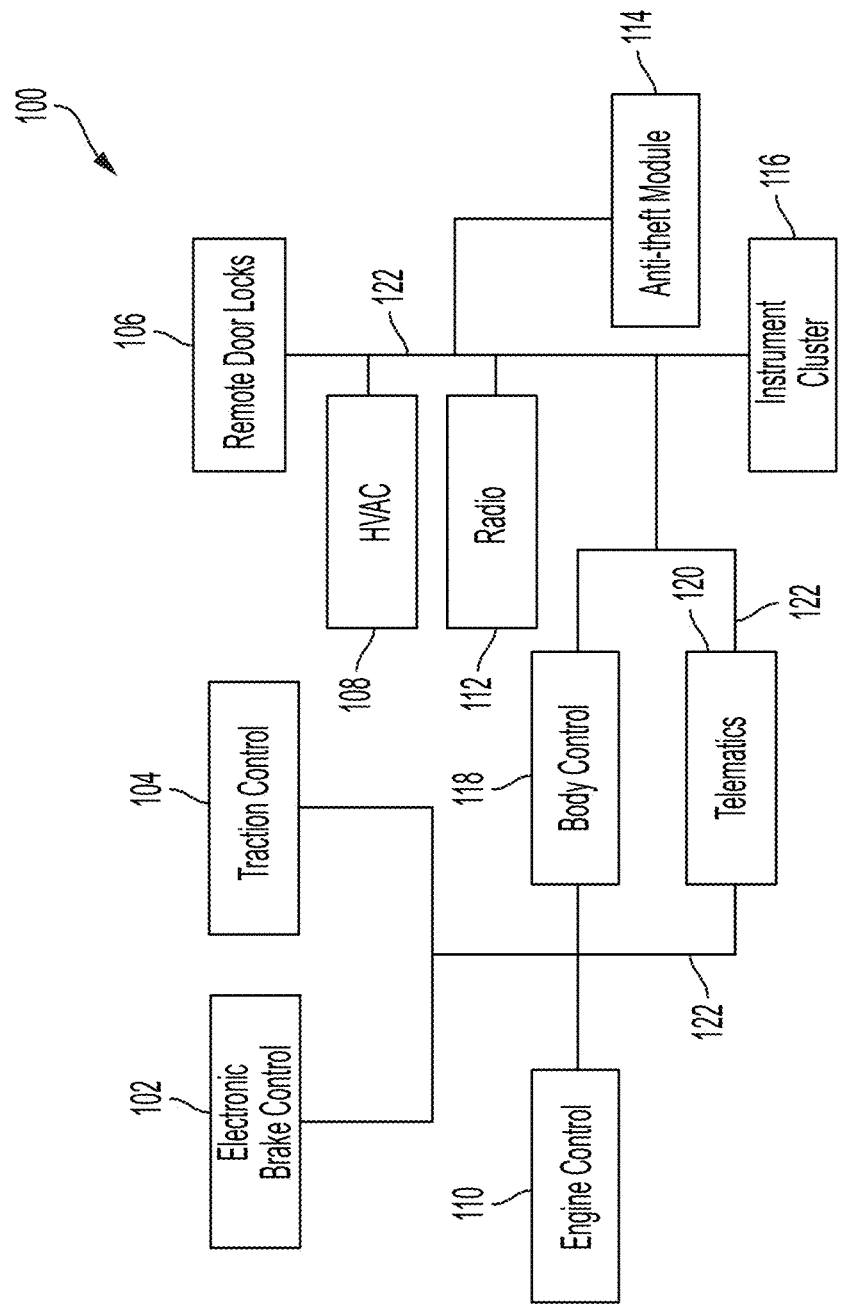
FIG. 1 illustrates an exemplary Controller Area Network (CAN) bus according to examples of the disclosure.

The following description sets forth exemplary methods, parameters, and the like. It should be recognized, however, that such description is not intended as a limitation on the scope of the present disclosure but is instead provided as a description of exemplary embodiments.

In the following description of the disclosure and embodiments, reference is made to the accompanying drawings in which are shown, by way of illustration, specific embodiments that can be practiced. It is to be understood that other embodiments and examples can be practiced, and changes can be made, without departing from the scope of the disclosure.

In addition, it is also to be understood that the singular forms "a," "an," and "the" used in the following description are intended to include the plural forms as well unless the context clearly indicates otherwise. It is also to be understood that the term "and/or" as used herein refers to and encompasses any and all possible combinations of one or more of the associated listed items. It is further to be understood that the terms "includes," "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations of physical quantities as modules or code devices without loss of generality.

However, all of these and similar terms are to be associated with the appropriate physical quantities and are merely convenient labels applied to these quantities. Unless specifically stated otherwise as apparent from the following discussion, it is appreciated that, throughout the description, discussions utilizing terms, such as "processing," "computing," "calculating," "determining," "displaying," or the like refer to the action and processes of a computer system, or similar electronic computing device, that manipulates and transforms data represented as physical (electronic) quantities within the computer system memories or registers or other such information storage, transmission, or display devices.

Certain aspects of the present invention may include process steps and instructions described herein in the form of an algorithm. It should be noted that the process steps and instructions of the present invention could be embodied in software, firmware, or hardware, and, when embodied in software, they could be downloaded to reside on, and be operated from, different platforms used by a variety of operating systems.

As discussed above, modern automobile can include many independent control systems that work with one another to provide control of the overall vehicle. Each of the independent control systems can be controlled by a component called an electronic control unit (ECU) that is not only configured to operate and control specific systems within an automobile but can also communicate with other ECUs in the vehicle through a CAN bus as described in detail below.

FIG. 1 illustrates one or more exemplary Controller Area Networks (CANs) according to examples of the disclosure. In one or more examples, the CAN system 100 depicted in FIG. 1 can include multiple CAN networks, each of which include one or more ECUs 102, 104, 106, 108, 110, 112, 114, 116, 118, and 120 that are communicatively coupled to one another through a CAN bus 122. In one or more examples, ECU 118 and 120 can act as "bridges" between two separate CAN networks, meaning that each of ECU 118 and 120 can communicate with multiple CAN networks. ECUs 102, 104, 106, 108, 110, 112, 114, 116, 118, and 120 can control critical systems within an automobile like braking and steering, as well as comfort systems, such as adaptive cruise control and advanced infotainment.

In one or more examples, ECU 102 can be configured to control the electronic brake control systems within an automobile, ECU 104 can be configured to control a traction control system within the automobile, ECU 106 can be configured to control one or more remote door locks 106 in the automobile, ECU 108 can be configured to any heating, ventilation, and air conditioning systems within the automobile, ECU 110 can be configured to control the engine of the automobile, ECU 112 can be configured to control an am/fm radio or other infotainment systems within the vehicle, ECU 114 can be configured to control an anti-theft system (i.e., lowjack), ECU 116 can be configured an electronic instrument cluster (i.e., speedometer, oil pressure, etc.) of the vehicle, ECU 118 can be configured to control the body of the vehicle, and ECU 120 can be configured any telematics elements within the automobile such as GPS systems. The above ECU examples are meant for illustrative purposes only. The present disclosure should not be seen as being limited to the above examples, and a vehicle could contain more or less or different ECUs within in than the ones described above with respect to FIG. 1.

Also as discussed above, in one or more examples, each ECU within the system 100 can be communicatively coupled to one another using a CAN bus 122. In one or more examples, CAN bus 122 can be configured to transmit messages between ECUs using a Controller Area Network protocol. The Controller Area Network protocol is a standard automotive networking protocol that can be used to facilitate communications between one or more ECUs within a vehicle. While the disclosure contained within discusses the CAN protocol in the context of vehicles, the disclosure should not be seen as limited to that context. For instance, the systems and methods discussed within the present disclosure can also be applied to other contexts in which CAN can be employed, such as electronic equipment, elevators, escalators, building automation, medical instruments, and other multi-system devices that can utilize the benefits of the CAN protocol.

The CAN protocol allows for each ECU in the system to communicate with other ECUs in the system in a coordinated manner. In one or more examples, CAN bus 122 can be configured to allow for a single ECU in the system to broadcast its message at any given time. Each ECU can thus have its own transceiver that is configured to send and receive messages using the CAN protocol.

Figure 2:
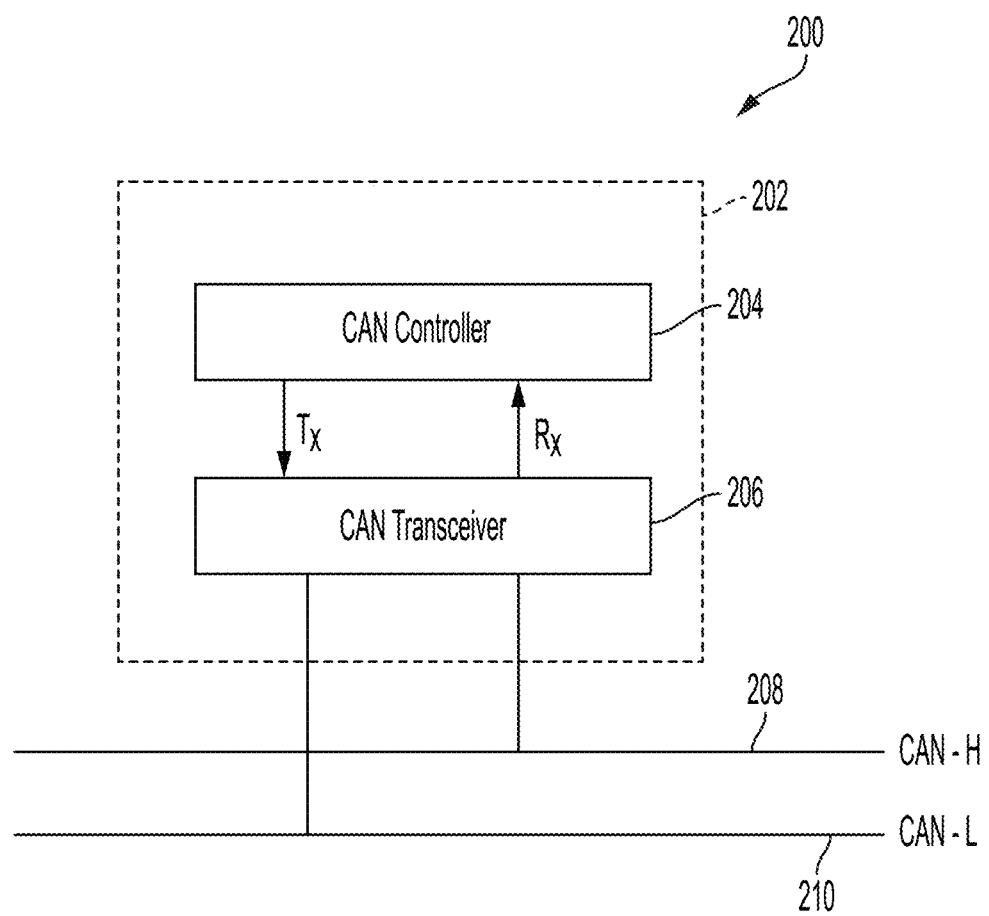
FIG. 2 illustrates an exemplary electronic control unit (ECU) of a CAN bus according to examples of the disclosure.

FIG. 2 illustrates an exemplary electronic control unit (ECU) of a CAN bus according to examples of the disclosure. In the example of FIG. 2, the system 200 can include an ECU 202. ECU 202 of FIG. 2 can represent an exemplary ECU of the ECUs described with respect to FIG. 1. In one or more examples, the ECU 202 can include a CAN controller 204 and a CAN transceiver 206 that can both be configured to allow for the ECU 202 to communicate with other ECUs in the system using the CAN protocol.

As discussed above, the CAN protocol can allow for a single ECU to broadcast a message on a CAN bus that can be received by all of the ECUs in the network simultaneously. Each ECU in the system can receive messages on the CAN network and decode those messages to determine whether the received message requires that particular ECU to take an action.

In one or more examples, the CAN transceiver 206 can be configured to both transmit to and receive signals from a CAN bus. The CAN transceiver 206 can be responsible for interfacing with the CAN bus, by appropriately driving a differential CAN bus (described in further detail below) so that ECUs on the CAN Network can send and receive CAN transmissions.

In one or more examples, the CAN physical layer (i.e., the electronic circuit transmission technologies of a network) can use two parallel cables to connect each and every ECU in a system thus forming the CAN bus. One cable, can be defined as CAN High 208, the other can be defined as CAN Low 210. As described in further detail below, the CAN bus can include two signaling states. The dominant state, corresponding to a logic 0 and the recessive state corresponding to a logic 1. In the dominant state, the transceiver 206 of ECU 202 can pull the CAN high line 208 to the system voltage and can pull the CAN low line to ground. In the recessive state (i.e., a logic 1), the transceiver 206 of ECU 202 can pull the CAN high line 208 to ground, and can pull the CAN low line to the system voltage (i.e., release both lines). In this way, each of the CAN high line 208, and CAN low line 210 can signal a particular logic state by transitioning the amount of voltage on the line between ground and the system voltage depending on whether the current bit being transmitted is a logic 1 or a logic 0. In one or more examples, in the event that no messages are being transmitted (i.e., the CAN bus is neither transmitting a 1 or 0) the CAN high line 208 and CAN low line 210 can be kept in the recessive state, corresponding to a logic 1 so that other ECUs on the network can assert thus CAN bus (i.e., put it in the dominant state). In one or more examples, in the recessive state, the CAN High and CAN Low lines can settle to the same voltage due to one or more termination resistors on the lines connecting the two lines at either end of the bus.

In one or more examples, the CAN transceiver 206 of ECU 202 can also include a CAN controller 204. The CAN controller 204 can be configured to work in conjunction with CAN transceiver 206 to send and receive messages to and from the CAN bus. In one or more examples, the CAN controller can be configured to handle bit timing, transmission synchronization, message framing, as well as error handling functionalities associated with receiving and transmitting messages using the CAN protocol.

As discussed above, the CAN controller 204 and the CAN transceiver 206 can work in conjunction with one another as part of ECU 202 to transmit and receive messages formatted in accordance with the CAN communication protocol. As will be further discussed in detail later below, the physical layer of the CAN communication protocol can be used to secure messages sent on the CAN bus.

Figure 3:
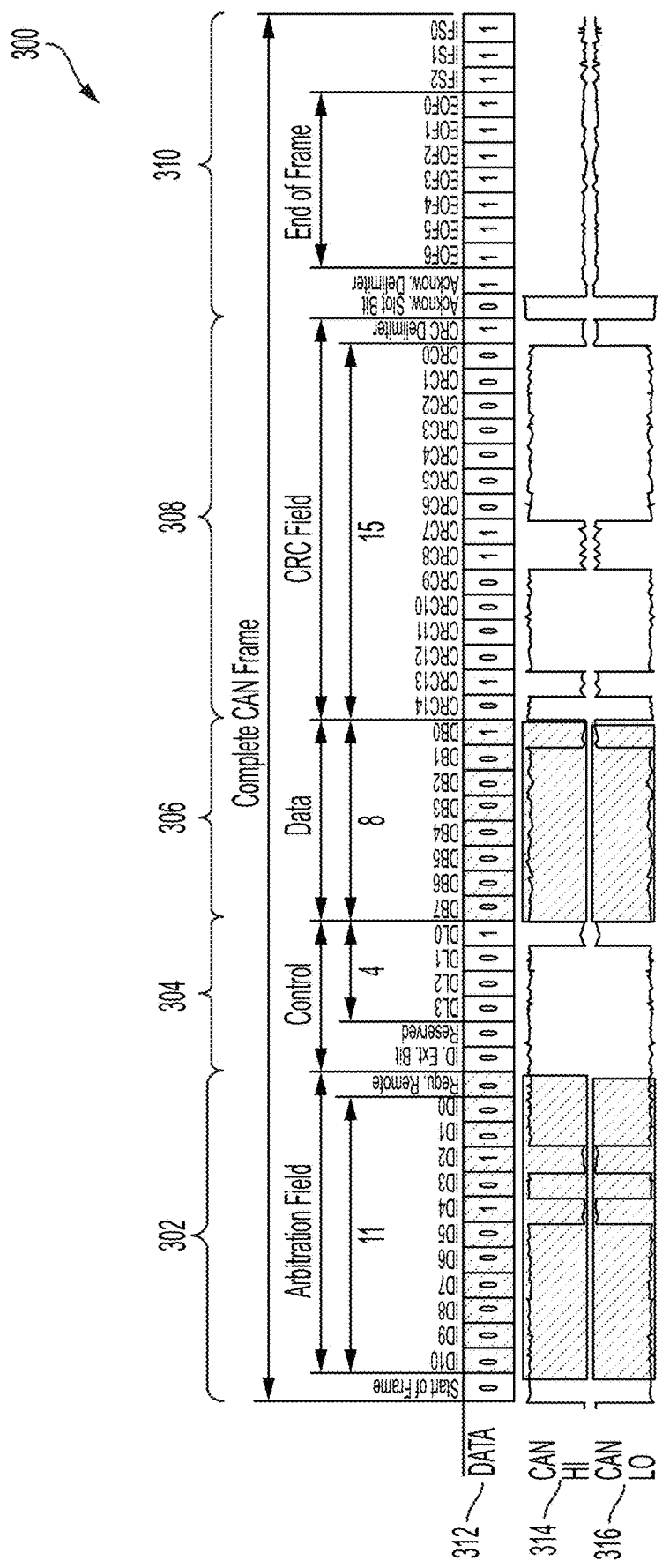
FIG. 3 illustrates an exemplary messaging format employed by an ECU of a CAN bus according to examples of the disclosure.

FIG. 3 illustrates an exemplary messaging format employed by an ECU of a CAN bus according to examples of the disclosure. The example of FIG. 3 illustrates an exemplary frame 300 of a data transmission from an ECU, wherein the data transmission is formatted in accordance with the CAN protocol. In one or more examples, a CAN frame 300 can include five main fields 302, 304, 306, 308, and 310. Each field of the CAN frame 300 can represent specific information needed by each ECU connected to the CAN bus to decode transmitted messages.

In one or more examples, a CAN frame 300 can include an arbitration ID field 302. As discussed above, a CAN bus can allow for one ECU to transmit a message on the bus at a given time. The Arbitration ID thus can allow for priority to be assigned to messages in the event that two ECUs begin transmitting at the same time. In one or more examples, the Arbitration ID can also used to identify a type of message. In an automotive application, for example, Arbitration ID 0x01AB may correspond to a message from an ECU that includes information about the engine, such as its speed (i.e., RPM) and temperature. In one or more examples, a receiving ECU could look for messages with an ID of 0x01AB. When an ECU encountered a message with an arbitration ID of 0x01AB, it could then properly decode the payload of the message based on the Arbitration ID. Thus, in one or more examples, not only can the Arbitration ID signal what priority a given should be given, but can also identify which ECU the CAN message originated from.

In one or more examples, a CAN frame 300 can include a control field 304. The control field 304 can include information pertaining to whether the frame 300 is a remote request (from an external entity not directly connected to the CAN bus, as well as the length of the payload contained within the frame 300). In one or more examples, the CAN frame 300 can contain between zero and eight data bytes, and control field 304 can indicate the exact number of bytes contained in the payload. In one or more examples, a CAN frame 300 will also include a Cyclic Redundancy Check (CRC) field 308. The CRC field 308 can include the error-detection codes that can help to ensure data integrity during the transmission process. Finally, a frame 300 can also include an end of frame field 310. The end of frame field 310 can signal to other ECUs decoding the frame 300 that the frame has ended.

As discussed above, the data 312 contained in the frame 300 can be coded as 1s and 0s. Thus in the example of frame 300, arbitration field 302 can include 11 bits with each bit being either a 1 or 0, thereby encoding specific arbitration IDs using a specific combination of 1s and 0s. Based on whether a bit in the data 312 is a 1 or 0, the CAN transceiver 206 can transmit a particular waveform on the CAN HI line 314 and the CAN LOW line 316 as discussed above with respect to FIG. 2. In one or more examples, the length of the arbitration field 302 can include any number of bits, depending on what version of the CAN communications protocol is being employed. For example, if the system is using the CAN 2.0B specification, a CAN frame can utilize the extended frame format. In the extended frame format, the frame can include an 18 bit identifier extension that can result in a total arbitration field 302 length of 29 bits.

While the CAN bus system and network protocol discussed above with respect to FIGS. 2-3 can provide an efficient system and method for facilitating communications between ECUs in an automobile or other device, the CAN bus system can be vulnerable to attacks from malicious users or entity seeking to gain unauthorized control of a device. In one or more examples, a malicious user can gain access to and control of one or more ECUs within an automobile. As an example, one or more ECUs may be remotely accessible as part of the functionality of the system that the ECU is contained within. For instance, referring back to FIG. 1, remote door locks ECU 106 can be remotely accessible by a user, so that the user can remotely open the door by engaging with the ECU 106. A malicious user could use the remote accessibility of the ECU to gain access to the ECU and then control that ECU to send messages to other ECUs in the CAN bus system.

Communication between ECUs in an automotive network can be typically periodic in nature. ECUs in the CAN bus network can send status messages at set intervals as defined by the network design. As an example, the engine control unit 110 can send a message containing the engine RPM at a 50 mS interval, and send a message containing the coolant temperature at a 500 mS interval. In one or more examples, CAN messages, as discussed above, contain an arbitration ID along with a payload. In one or more examples of the disclosure, each ECU can transmit messages with their own unique set of arbitration IDs at fixed intervals. Thus, each ECU can have its own set of arbitration IDs associated with it that can be used to identify which ECU in the CAN bus system the message originated from. With prior knowledge of the arbitration IDs of the ECUs and an ability to gain access and control to one or more ECUs, a malicious user can attack a CAN bus which could confuse and frustrate operations of a device utilizing that CAN bus.

FIG. 4a illustrates an exemplary messaging scheme for a CAN bus according to examples of the disclosure. The example of FIG. 4a can provide a context for understanding how malicious users can gain unauthorized access to a particular ECU or group of ECUs and then use those ECUs to manipulate a CAN bus, including the ECUs that are on the CAN bus but that are not directly controlled by the malicious user. In the example of FIG. 4a, the CAN bus 400 can include ECUs 402, 404, 406 (labeled in the figure as ECU A, B, and C respectively). In one or more examples, ECUs 402, 404, and 406 can transmit one or more messages using the CAN protocol. As discussed above, each ECU can transmit a unique set of arbitration IDs. Thus, in the example of FIG. 4a, ECU 402 can transmit messages on CAN bus 408 using a set of arbitration IDs that are unique and distinct from the set of arbitration IDs used by ECU 404 and ECU 406. In this manner, each ECU on the CAN bus 408 can have a unique set of arbitration IDs that are associated with it and can be used by other ECUs to identify the source of a particular message on the CAN bus 408.

With the context provided by FIG. 4a, FIGS. 4b-d provide examples of malicious users gaining access to one or more ECUs and using the arbitration ID characteristics of the CAN protocol described above to cause unauthorized operation of the ECUs on the CAN bus.

Figure 4B:
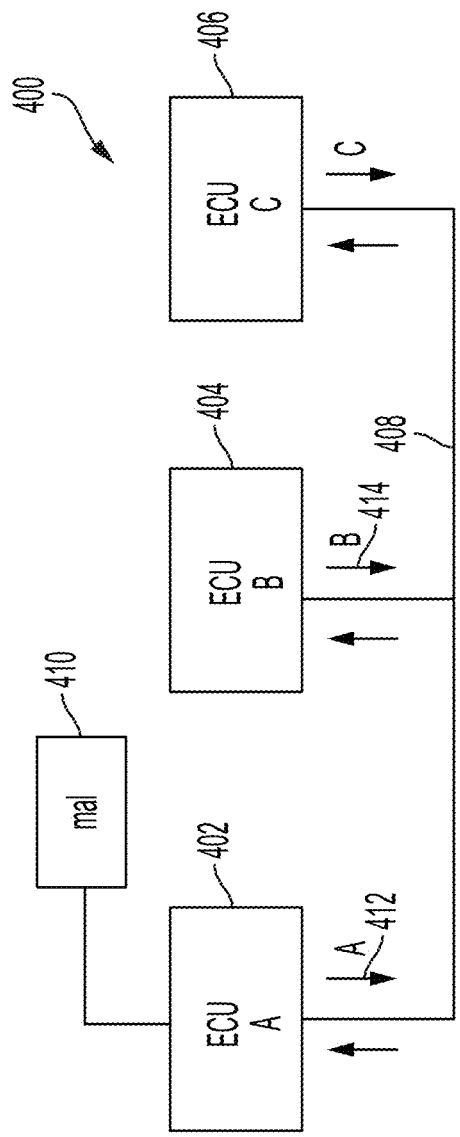
FIG. 4b illustrates an exemplary attack vector on a CAN bus according to examples of the disclosure.

FIG. 4b illustrates an exemplary attack vector on a CAN bus according to examples of the disclosure. In the example of FIG. 4b, a malicious user 410 can gain access to ECU 402 and specifically can control the messages that are being transmitted by ECU 402. The type of attack vector illustrated in FIG. 4b can be referred to as a fabrication attack. In one or more examples, in order to mount a fabrication attack, an attacker can have at least one fully compromised ECU, such as ECU 402 or another way to inject messages onto the CAN bus 408. In the fabrication attack, the malicious user 410 can create and send messages 412 across the bus 408 using ECU 402. The messages, however, rather than using arbitration IDs associated with ECU 402, can instead use arbitration IDs associated with ECU 404, thus allowing the malicious user 410 to trick other ECUs on the CAN bus 408 into believe that messages actually originating from ECU 402, are instead originating from ECU 404. In this way, even though a malicious user may not be able to access ECU 404, they can use their access to ECU 402 to trick other ECUs on the system into believing that it is transmitting messages from ECU 404, and thus effectively controlling the CAN bus 408 as if it were actually in control of ECU 404.

Figure 4C:
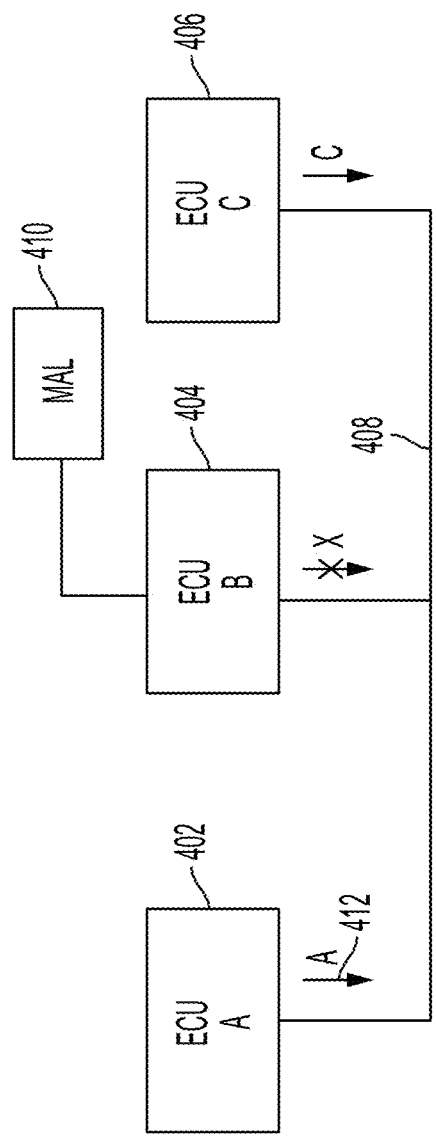
FIG. 4c illustrates another exemplary attack vector on a CAN bus according to examples of the disclosure.

FIG. 4c illustrates another exemplary attack vector on a CAN bus according to examples of the disclosure. The example of FIG. 4c can be referred to as a suspension attack. In one or more examples, in order to execute a suspension attack, the malicious user 410 may have only weakly compromised (i.e., not gained complete control) an ECU, such as ECU 404. In a suspension attack, the malicious user 410 can disable the weakly compromised ECU 404, preventing it from sending its set of messages. This suspension of messages can in turn cause another system such as the system associated with ECU 406 (as an example) in the car to malfunction. Since some ECUs may need to receive certain information to function properly, restricting that flow of information by disabling the ECU 404 can cause some systems of the car to malfunction or operate in non-ideal ways.

Figure 4D:
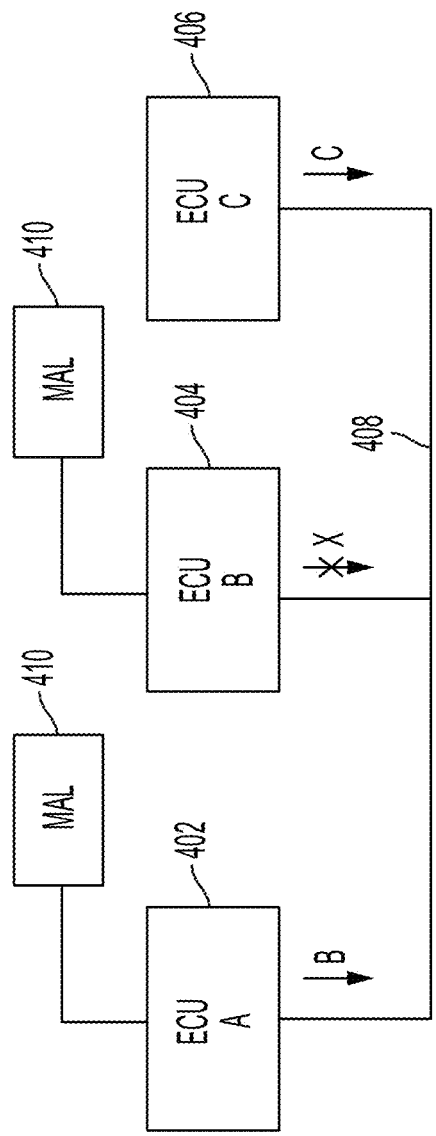
FIG. 4d illustrates another exemplary attack vector on a CAN bus according to examples of the disclosure.

FIG. 4d illustrates another exemplary attack vector on a CAN bus according to examples of the disclosure. In the example of FIG. 4d, a malicious user 410 can gain unauthorized access and control to ECUs 402 and 404. In one or more examples, and as described in detail below, the malicious user 410 can cause ECU 402 to transmit messages with arbitration IDs associated with ECU 404 (i.e., thereby masquerading as ECU 404) and can also cause ECU 404 to cease transmitting messages on the CAN bus 408. The type of attack depicted in the example of FIG. 4d can be referred to as a masquerade attack. In one or more examples, the masquerade attack can require an attacker to have control over two separate ECUs, a fully compromised ECU (such as ECU 402) and a weakly compromised ECU (such as ECU 404). The objective of this type of attack can be to manipulate an ECU while hiding the fact that another ECU is compromised. The example of FIG. 4d shows a masquerade attack, where ECU 402 can be strongly compromised and ECU 404 can be weakly compromised. In this example, the malicious user 410 can disable ECU 404 and begin to send messages usually sent by ECU 404 from ECU 402 at the appropriate intervals. With the masquerade attack, unlike the fabrication attack, the frequency and interval of messages may not change. Furthermore in the masquerade attack, the fully compromised ECU 402 and the weakly compromised ECU 404 are not sending conflicting messages so the attack, from a message frequency prospective, appears to be normal to other ECUs on the CAN bus 408.

The masquerade attack can have a number of benefits over a simple fabrication attack. In a fabrication attack, there can be a much higher chance of instability or error for other receiving nodes on the CAN bus 408. Masquerade attacks can also be much more difficult to detect since neither the spike in traffic of a fabrication attack or the dip in traffic of a suspension attack are present. Simply examining traffic frequency is not enough to detect a masquerade attack and can therefore make this type of attack undetectable.

In light of the vulnerabilities discussed above, a system and method for detecting malicious activity on a CAN bus is needed that can differentiate between authentic messages transmitted on a CAN bus by an ECU and transmission on a CAN bus that may be sent by malicious users when attempting to attack a device or system that utilizes a CAN. In addition to the needs described above, the system and methods should also be implemented in a manner that will not add significant computing complexity and overhead to the CAN and should be implemented such that the it can be added to pre-existing CAN buses without requiring significant modification to ECUs or other components on the CAN bus.

As will be described in detail below, using systems and methods that can determine the authenticity of a CAN transmission by examining the physical layer characteristics of a particular transmission can be an effect method of authenticating CAN transmission while also being minimally evasive to a pre-existing CAN system. In one or more examples of the disclosure, a device that can be attached to a pre-existing CAN, so as to record all CAN transmissions and that can be configured to authenticate a CAN transmission based on one or more physical layer characteristics, is provided below.

Referring back to FIG. 3, the physical layer of a CAN transmission can refer to the physical waveform (i.e., electrical signal) that is transmitted on the CAN bus, such as the CAN High waveform 314 and the CAN low waveform 316. As discussed in detail below, each ECU can transmit waveforms that can be distinguished from one another based on one or more physical characteristics of the waveform. Thus, the waveforms transmitted by each ECU in a CAN can act as a "fingerprint" that can be used to independently determine the origin of the waveform (as opposed to using arbitration IDs).

Figure 5:
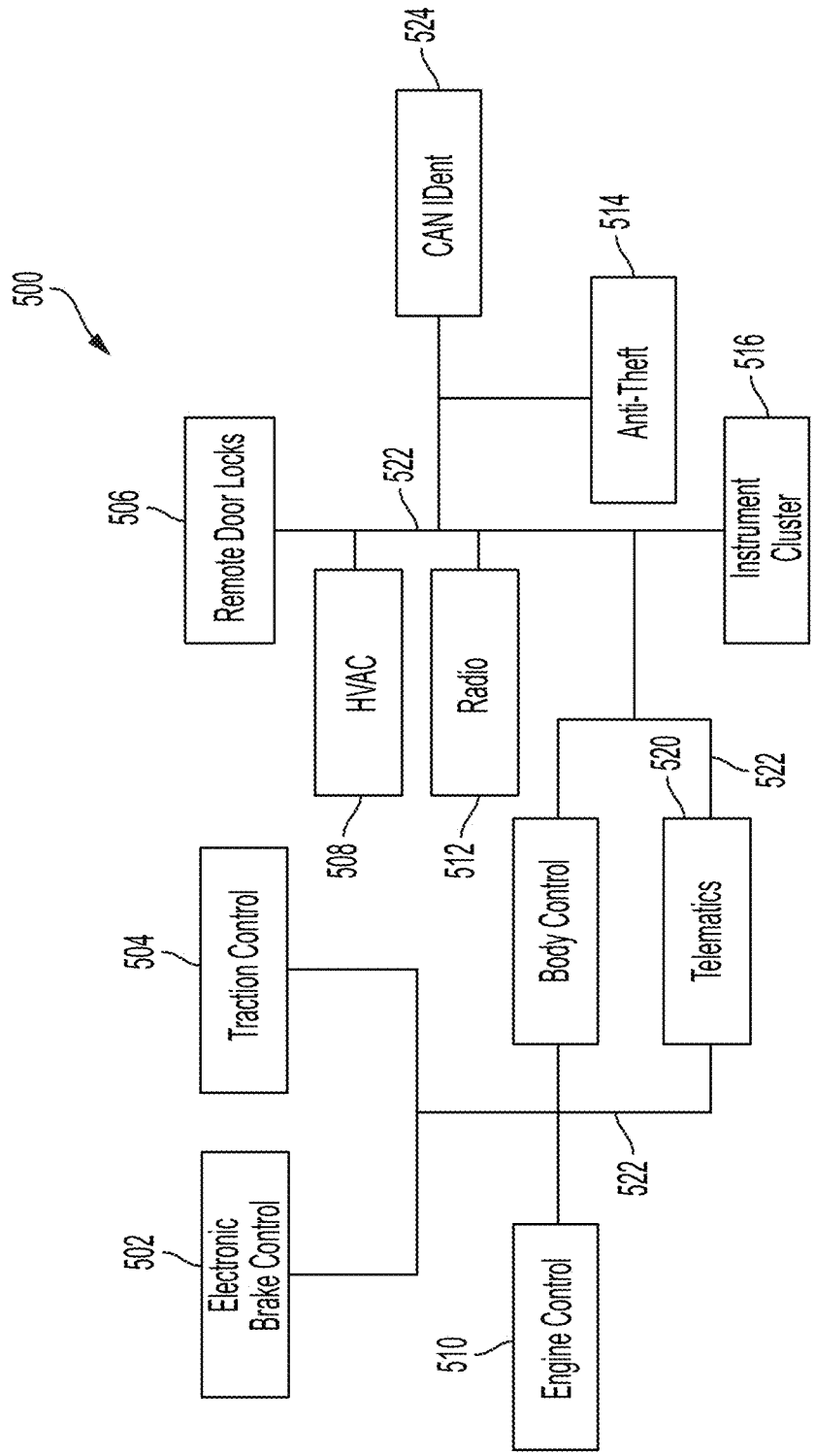
FIG. 5 illustrates an exemplary CAN physical layer identification device coupled to a CAN bus according to examples of the disclosure.

In order to minimize the impact that a CAN authentication scheme may have on an existing CAN bus, in one or more examples, the system and methods described below can be embodied in a stand-alone device that can be attached to a pre-existing CAN. FIG. 5 illustrates an exemplary CAN physical layer identification device coupled to a CAN bus according to examples of the disclosure. In the example of FIG. 5, the system 500 can be substantially similar to the system 100 described with respect to FIG. 1. For example, the system 500 can include components 502, 504, 506, 508, 510, 512, 514, 516, 518, 520, and 522 that are substantially identical to the components 102, 104, 106, 108, 110, 112, 114, 116, 118, 120, and 122, respectively. Thus for a description of those components, the description of their counterparts from FIG. 1 can be referenced above.

In one or more examples, the system 500 of FIG. 5 can additionally include a CAN Physical Layer Identification device 524 that can be communicatively coupled to CAN bus 522 and can be configured to receive transmissions that are sent via the CAN bus to other ECUs in the system 500. In this way, the device 524 can be situated in the system 500 in substantially the same manner as an ECU, insofar as the device 524 can receive CAN transmissions from other ECUs and can also be configured to transmit CAN messages onto the CAN bus 522.

As briefly described above, the identification device 524 can use physical characteristics of the signals transmitted as well as the arbitration IDs transmitted with those message by the ECUs that are coupled to the device 524 s to determine the authenticity of a CAN transmission by an ECU.

One physical characteristic of a CAN signal that can be used to identify the source of a message can be the edge transitions that can occur on both the CAN High and CAN Low lines on a CAN bus. An edge transition can refer to the waveform generated when a CAN High or CAN Low transmission line is transitioned from the system voltage to ground or vice versa (i.e., the bit being transmitted by an ECU changes from 1 to 0 or vice versa.) Since rise and fall times, as well as the general shape of a edge transition waveform can be unique to an ECU and dependent upon the specific hardware components in an ECU as well as the operating conditions of an ECU, the physical characteristics of an edge transition waveform can act as a fingerprint that can be used to uniquely identify an ECU on a CAN bus.

In order to identify the source of a CAN transmission by the physical characteristics of its edge transitions, as a preliminary matter, the physical characteristics of edge transitions may need to be recorded and associated with a particular ECU. This can be analogous to fingerprinting an individual and then storing the fingerprint and associating it with the name of the individual who provided the print for future use. As discussed above, each ECU in a CAN bus can transmit a unique set of arbitration IDs. Thus, when the physical characteristics of an edge transition are recorded, the arbitration ID associated with the transmission can be used to identify the source of the transmission and thus associate an ECU with a particular set of physical characteristics. This information, as described in further detail below, can then be later used to authenticate transmissions on a CAN bus.

In one or more examples, the device 524 of FIG. 5 can be implemented using statistical signal processing. Thus, in order to implement the device 524 to authenticate CAN messages, the device can be trained during a training phase (described in further detail below) to record the physical characteristics of a plurality of edge transition waveforms across multiple CAN frames to generate an average transition waveform (i.e., a distribution for each edge transition waveform) for each ECU on the CAN bus. Each average transition waveform can be associated with a particular ECU during the training phase. Once the training phase is complete, the device 524 can then be used in real-time to authenticate a CAN transmission by recording one or more edge transitions of a CAN message and then classifying the message as belonging to a particular ECU based on the data collected during the training phase.

Figure 6:
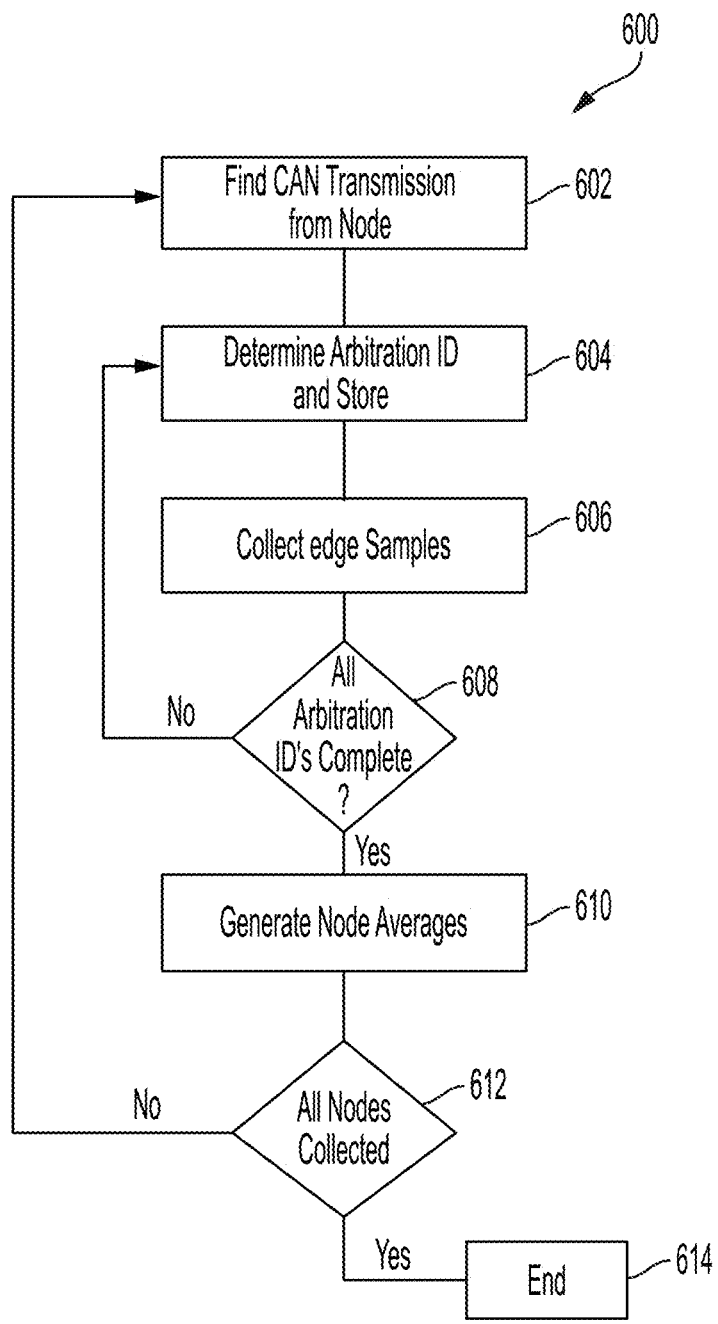
FIG. 6 illustrates an exemplary process for training a classifier implement on a CAN physical layer identification device according to examples of the disclosure.

FIG. 6 illustrates an exemplary process for training a classifier implemented on a CAN physical layer identification device according to examples of the disclosure. The process 600 of FIG. 6 can be used to create one or more edge profiles for each ECU on the CAN bus. The edge profiles can then be used during the operation of the device 524 to determine the identity of the source ECU of a particular CAN frame. During the training phase of device 524, the process 600 can represent a supervised training procedure for creating one or more edge profiles for each ECU in the CAN bus. Process 600 can begin at step 602, wherein a single ECU in the CAN can be made to transmit one or more frames onto a CAN bus. The device 524 can be attached to the CAN bus and can thus receive the transmissions from the ECU.

At step 602, the ECU can receive a CAN transmission from a pre-determined ECU. Once the transmission has been acquired by the device 524, the process can move to step 604, wherein an arbitration ID associated with transmission from an ECU can be acquired. As discussed above, each ECU in a CAN can transmit a unique set of arbitration IDs. Thus at step 604, the arbitration ID associated with the ECU that is currently being used to train the classifier in device 524 can be extracted from a CAN frame and stored in memory. As will be discussed in detail further below, this arbitration ID can be used to identify a particular ECU on the CAN.

Once the arbitration ID has been extracted and recorded at step 604, the process 600 can move to step 606 wherein the edge samples from both the CAN High and CAN Low wires can be extracted from the CAN frame that was transmitted by the ECU. Since each of the CAN High and CAN Low wires can include both rising and falling edges, there can be a total of 4 different types of transitions to use in creating a feature space that can be used to classify edges during operation of the device 524. The 4 types of transitions can include a CAN High rising edge, a CAN High falling edge, a CAN Low rising edge, and a CAN Low falling edge.

Figure 7:
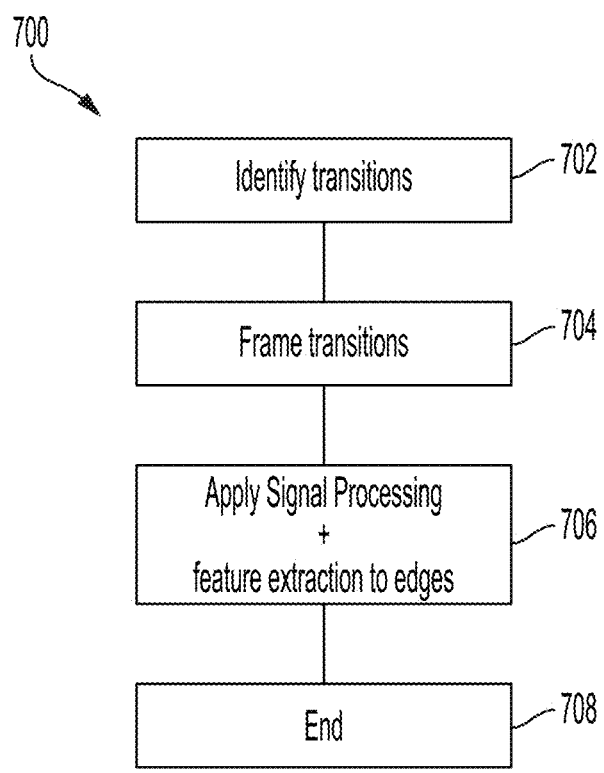
FIG. 7 illustrates an exemplary edge collection process according to examples of the disclosure.

FIG. 7 illustrates an exemplary edge collection process according to examples of the disclosure. The process 700 of FIG. 7 can be performed at step 606 of the process 600 of FIG. 6 in order to extract edge transitions. The process 700 of FIG. 7 can, in one or more examples, be performed on each of the CAN High wire and the CAN Low wire. At step 702 of the process 800, each of the CAN High and the CAN Low wires can be put through one or more signal processing stages to identify edge transitions in a CAN frame signal. For example, and in one or more examples of the disclosure, the CAN High and CAN low lines can be captured by converting the analog signals on each line into digital signals using an analog-to-digital converter (ADC). The resulting digital signal can then be run through an edge detection and filtering system that can gate the data from the ADC to only pass samples around edge transitions. For a given edge, the digital signal is captured for M samples before and N samples after the edge transition event. N is a number of samples is network dependent based on the length of time it takes for the bus to return to a steady state after an edge transition. The purpose of the edge detect and gating system can be to isolate symbol transmissions from the rest of the CAN frame. There can be an upper limit to N based on the assumption that the network returns to a steady state before the next symbol is transmitted.

In one or more examples, in order to identify transitions in a CAN frame at step 702, the process can first determine the times during a frame of CAN data that an edge transition occurs. In one or more examples, a matched filter can be utilized so as to convolve the entire CAN High or CAN Low waveform of a frame with a heavyside step function. Alternatively, in one or more examples, the receive line of an existing off the shelf CAN transceiver can be utilized to identify edge transmissions. Both of the above methods for determining the times during a frame CAN data that an edge transition occurs can repeatedly identify samples within a CAN High or CAN Low waveform in which an edge transition occurs with a high degree of reliability. The above methods for identifying transitions are meant as examples, and other methods could also be employed to identify edge transitions.

The matched filter based method for finding edge transitions in a CAN frame described briefly above can involve creating a discrete heavyside step function, and then convolving that with the captured CAN frame for CAN High. In one or more examples, the output of the matched filter can be used to locate the samples of the CAN High waveform that best match the heavyside step function. In one or more examples, a step function with a length of ¼ the number of samples in a bit can be chosen. The CAN bit timing logic handling synchronization can typically tolerate a transient response lasting up to ⅛ of the total bit time, and therefore the length of the heavyside step can be chosen to be ¼ of the number of samples in 1 bit. The number of samples in a bit can be defined as the sample rate in Hertz divided by the bitrate. The heavyside step function used in the convolution can be defined Equation (1). The discrete convolution used between the CAN High waveform, and the heavyside step function h is described by Equation (2) below, where L is the length of the CAN High waveform.

$$h[x] = \begin{cases} -1 & \text{if } 0 < x \geq len/2 \\ 1 & \text{if } len/2 < x \leq len \\ 0 & \text{Otherwise} \end{cases} \quad \text{Equation (1)}$$

$$(a*h)[n] = \sum_{m=0}^{L} a[m]h[n-m] \quad \text{Equation (2)}$$

Once the location of the edge transitions within a frame are identified at step 702, the process 700 can move to step 704 in order frame each of the identified transitions. Framing a transition can refer to the process of choosing an appropriate number of samples before and after each identified edge so as to completely capture the physical characteristics of the rise and fall of each edge. The number of samples that are chosen to be part of the framed edge as well as the position of the transition in the frame can be dependent on the transient response of the edge itself as transmitted by an ECU. For example, placing the position of the transition early in the detection window can maximize the number of samples in which the edge transient remains, while minimizing the steady state portion of the frame.

Once the edge transitions, or symbols are isolated from the entire frame, the process 700 can move to step 706, wherein each framed edge can then be transformed through a signal processing and feature extraction process. The goal of step 706 can be to expose features from the received symbols that best distinguish edges transmitted from each ECU. In one or more examples, the signal processing and feature extraction process can include down sampling each collected edge frame. Down sampling can refer to the application of an anti-aliasing filter and a decimation operation to each framed edge transition. Down sampling each edge transition can reduce high frequency components of the edge as well as to reduce the number of samples stored in a particular captured edge frame.

In one or more examples of the disclosure, the signal processing and feature extraction process of step 706 can also include performing edge scaling on each frame collected at step 704. Edge scaling can refer to the process of normalizing each of the edge in each collected frame so as to remove the effects of different ground and voltage references that may be present at each node in the network. The differences in references between ECUs could cause variations in the steady state sections of the edge transitions not driven by the topology of the busy, thus possibly introducing errors later in the classification processes described with respect to FIG. 6 and FIG. 8 below. The edge scaling step can find optimal scaling and offset factors for an edge in order to match a unit step as closely as possible.

In one or more examples, each ECU in a network could have a slightly different ground reference. There are no guarantees all nodes in the network are using the same voltage source, which would result in each ECU driving the bus to a different voltage level. Even if all ECUs used the same voltage source, variations in voltage conversion circuitry onboard could also lead to slight differences in the dominant voltage levels that an individual ECU drives on the bus. Variations in these voltage references could cause a voltage offset or a scaling of the edge transitions.

Edge scaling can find the optimal scaling factor s and voltage offset o for each edge d so the edge matches, as closely as possible, to a unit step. Equation (3) below illustrates a linear equation describing how a unit step is transformed. In order to perform edge scaling, the processing step then subtracts the o set and divides by the scaling factor to transform each edge into a unit step. For rising edges, the scaling factor can be positive, and for falling edges the scaling factor can be negative. Since Ax=b typically does not have a solution for the edge data being used, a different approach can be taken to find a value of x that minimizes the error.

$$Ax = b \quad \text{Equation (3)}$$

$$A = \begin{bmatrix} -1 & 1 \\ -1 & 1 \\ \vdots & \vdots \\ 1 & 1 \\ 1 & 1 \end{bmatrix} \quad x = \begin{bmatrix} s \\ o \end{bmatrix} \quad b = \begin{bmatrix} d[0] \\ d[1] \\ d[2] \\ \vdots \\ d[N-2] \\ d[N-1] \end{bmatrix}$$

In one or more examples, the signal processing and feature extraction process of step 706 can also include performing a differentiation algorithm on each framed edge. Much like edge scaling, differentiation can remove DC offset and scaling issues potentially caused by differences in voltage and ground references for each ECU. Taking the differential of each edge can remove variations in DC components that may affect the classification algorithms, while hopefully preserving the transients unique to each ECU. Since each edge is scaled and shifted by the heavyside step function, differentiating can result in that node's impulse response through the network. In one or more examples of the disclosure, differentiation and edge scaling can be complementary to one another and can be used independently or together.

In one or more examples, the signal processing and feature extraction process can also include taking the magnitude of the Fourier transform of the edges from each frame of the frames collected at step 704. Taking the magnitude of the Fourier transform of the edges from a frame can provide the magnitude of the frequency components in the signal regardless of phase. This approach to feature extraction can engender significant benefits. For instance the FFT magnitude can be immune to small alignment errors in the frame windowing step 204. A few samples of offset should not drastically change the FFT magnitude since the frequency content of the edge transition can remain the same regardless of alignment. Another benefit of taking the FFT magnitude of the signal is that DC offsets are theoretically contained in the DC bin of the FFT. The remaining bins can be largely unaffected by DC offsets in the signals. Another benefit to examining the FFT magnitude of the edge transition is the ease of which certain frequency ranges can be ignored. It can be possible that not all frequency ranges of the edge signal contain information useful for differentiating source ECUs. With an FFT magnitude, these bins can be simply ignored. In one or more examples, and in an effort to avoid unnecessary calculations, the FFT in the signal processing step can be a real FFT, since all the edge data is real-valued. The real FFT operation only calculates the positive frequency components of the signal, as the negative frequency components can be mirrored version of their positive counterparts. Calculating only real components of an FFT reduces memory usage by half, and can reduce the number of clock cycles for computation by half.

Returning to the example of FIG. 7, once the signal processing and feature extraction step of 706 has been completed the process 700 can then move to step 708 wherein the process is terminated. The conclusion of process 700 (i.e., 606) can conclude with a plurality of captured edge transitions from an ECU frame, and can also include one or more features that have been extracted from each captured edge as described above.

Returning to the example of FIG. 6, once all edge samples have been collected for a frame at step 606, the process 600 can move to step 608 wherein the process 600 determines if all arbitration IDs of a given ECU have been collected by the device 524. If not, the process can revert back to step 604 to store data associated with other arbitration IDs that are transmitted by the ECU. If all the arbitration IDs associated with an ECU have been stored, the process 600 can move to step 610 wherein an average edge transition physical characteristics template can be generated for the ECU.

As discussed above, each transition in a frame can be collected and stored. At step 610, the collected frames for a given node can be averaged to create an average transition waveform. The average transition waveforms, as discussed further below, can be used to determine the identity of the transmitting ECU for a given CAN transmission. At the conclusion of step 610, the ECU being analyzed can have a plurality of transition average waveforms associated with it. In one or more examples, the ECU can have four average transition waveforms. The first can be an average transition waveform for a rising edge on the CAN High line, the second can be an average transition waveform for a rising edge on the CAN Low line, the third can be an average transition waveform for a falling edge on the CAN High line, and the fourth can be an average transition waveform for a falling edge on the CAN Low line. The average transition waveforms can be used during operation of the device 524 to compare collected waveforms and classify them as likely belonging to one of the ECUs on the CAN. In one or more examples, the average transition waveform can be generated by simply adding each frame collected at step 606 and dividing by the number of frames to generate an average waveform.

Once the average transition waveform has been collected at step 610, the process can move to step 612, wherein a determination is made as to whether all ECUs in the CAN have an average transition waveform associated with it. If it is determined that not all ECUs in the CAN have an average transition waveform associated with it, the process can revert back to step 604 to begin the process of collecting data for a new ECU in the CAN. If however at step 612 it is determined that all ECUs have an average transition waveform associated with it, the process 600 can move to step 614, wherein it is terminated.

The process described above with respect to FIG. 6 can be used to train the classifier in device 524 to classify an edge transition waveform collected at the device as belonging to an ECU of a CAN. The process described at FIG. 6 can be completed before the device 524 is put into operation, and thus it can be assumed that no malicious user has gained control of any of the ECUs on the CAN. Once the classifier has been trained as described above, the device 524 can be placed into operation and as described below be used to authenticate CAN transmissions during the operation of the CAN.

Figure 8:
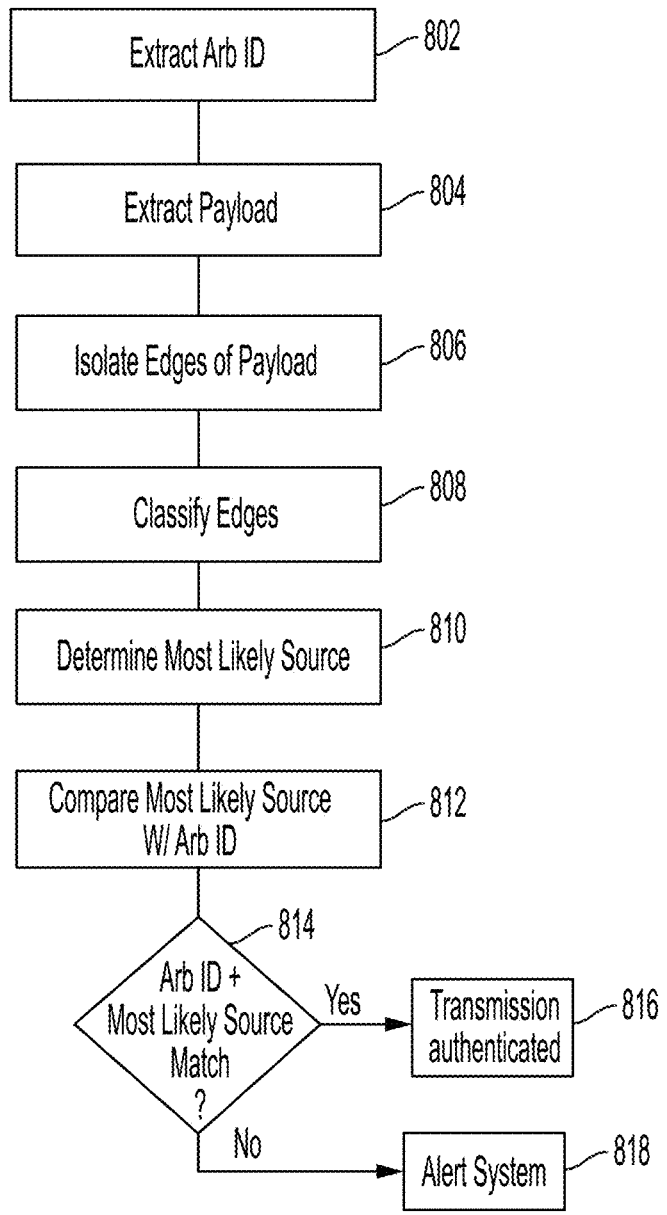
FIG. 8 illustrates an exemplary process for performing ECU identification and authentication using a CAN physical layer identification device according to examples of the disclosure.

FIG. 8 illustrates an exemplary process for performing ECU identification and authentication using a CAN physical layer identification device according to examples of the disclosure. As described in detail below, the process 800 of FIG. 8 can be used to determine the identity of the ECU that transmitted a CAN message and cross-reference the determined identity with the arbitration ID of the transmission to determine if the message is authentic or suspicious.

The process 800 can be at step 802, wherein a CAN frame can be collected and the arbitration ID of the frame can be extracted. The arbitration ID collected at step 802 can be stored in a memory to be used later in the process 800. As discussed above, in one or more examples, each ECU in a CAN can transmit unique arbitration IDs and thus effectively the arbitration ID can act as an identification number that announces to the other ECUs in the CAN which ECU is the source of the transition. As further discussed below, if the arbitration ID collected at step 802 does not match the result of the classification based on the physical characteristics of the edge transitions of a frame, then the ECU transmission can be deemed to be suspicious.

Once the arbitration ID has been extracted at step 802, the process can move to step 804 wherein the payload of the CAN transmission is extracted so as to examine the edge transmission waveforms of the payload and compare them with the average transmission waveforms of each ECU in the CAN generated in the process described above with respect to FIG. 6.

Once the payload of a frame has been extracted at step 804, the process can move to step 806, wherein the edge transitions of the payload can be isolated and framed. The process of isolation and framing edge transitions of a CAN payload can be substantially similar to the process described above with respect to FIG. 7. At the conclusion of step 804, and similar to the conclusion of process 700 described above with respect to FIG. 7, the device 524 can store a plurality of edge transitions for both the CAN High and CAN Low lines that have been framed and, which as discussed below, can be used to deduce a source ECU for the transmission being analyzed.

As discussed above, each ECU in a CAN can have unique signal characteristics with respect to its edge transition waveforms. These unique characteristics can be attributed to the specific hardware employed by each ECU, the reference voltages used to control each ECU, and the unique channel created between each ECU in the CAN and the device 524 used to authenticate ECU transmissions on the CAN. At the end of step 804, four different types of edge transitions can be captured: (1) rising edge transitions on CAN High; (2) falling edge transitions on CAN High; (3) rising edge transitions on CAN Low; and (4) falling edge transitions on CAN Low. Each of the four different types of edge transitions for each ECU in the CAN can have their own unique physical characteristics. Thus, after isolating the edge transitions associated with the message payload on both the CAN High and CAN Low lines at step 804, the process can move to step 806, wherein each isolated edge transition can be compared to the appropriate average transition (discussed in detail below) and then ultimately be classified as belonging to one of the ECUs in the CAN.

In one or more examples, at step 806, classifying each edge transition at step 804 as belonging to a particular ECU in the CAN can include employing a Gaussian Mixture Model (GMM) to determine which ECU the isolated edge likely came from. The GMM can assume that the transmissions from each ECU fit a multivariate gaussian distribution with a given center and covariance. By using pre-calculated center and covariance for each ECU, the GMM can predict the probability that an unknown edge was part of each of the ECUs distributions for the system. In one or more examples, a separate center and covariance are calculated for each of the four average edge transition types described above. Each edge collected at step 804 can then be classified as belonging to the ECU with the distribution the edge was most likely to have come from at step 806.

In one or more examples, at step 806, classifying each edge transition at step 804 as belonging to a particular ECU in the CAN can include employing a Nearest Neighbor approach. The Nearest Neighbor approach is a simplified version of the GMM with a covariance equal to the identity matrix. Instead of calculating probabilities for each ECU, the Nearest Neighbor classification algorithm can calculate the Euclidean distance between each unknown symbol and each of the appropriate ECU average edge transitions.

Both the GMM and the Nearest Neighbor classifiers can used to implement a One-Versus-All (OVA) multi-class classification scheme. In an OVA classification scheme, for N classes, N classifiers can be created. Each sample of each isolated edge transition can be input into all N classifiers, and the decision can be made from the results as to which classifier has the highest confidence score. Equation 4 below mathematically characterizes the decision process, where y can be the predicted label and $f_n$ can be the classifier for label n.

$$\hat{y} = \underset{n \in 1 \ldots N}{\operatorname{argmax}} f_n(x) \qquad \text{Equation (4)}$$

Each of the GMM and Nearest Neighbor classifiers can also, in one or more examples, be used to implement an All-versus-All (AVA) multi-class classification scheme. In AVA classification N(N-1) classifiers can be created. Equation 5 below can mathematically represent the decision process for an AVA classification scheme.

$$\hat{y} = \underset{n \in 1 \ldots N}{\operatorname{argmax}} \sum_m f_{nm}(x) \qquad \text{Equation (5)}$$

In the above equation $f_{nm}$ can be positive for samples in class n and negative for samples in claim, and $f_{nm}=-f_{mn}$. The differences between the OVA and AVA methods can be largely computational. OVA can require on N classifiers while AVA can require N(N-1) classifiers. The classifiers in AVA however may be less complex, since they only need to distinguish between two classes as opposed to N.

In the example of using a GMM to classify edges, a GMM can refer to the probability function consisting of the sum of several different distributions, with each representing a different class or component. Each component's distribution can be described by a center μ and a covariance Σ. The covariances of each component can be diagonal or full. In unsupervised learning scenarios, where true labels for each data point may be unknown, the distribution for each mixture can be calculated based on a training set using an Expectation Maximization (EM) algorithm. A GMM with M components is shown in Equation 6 below. Here $w_i$ can represent the mixture weights, and the function g(x) can represent the density functions for each of the distributions.

$$p(x|\lambda) = \sum_{i=1}^{M} w_i g\!\left(x \mid \mu_i, \sum_i\right) \qquad \text{Equation (6)}$$

Adapting the Gaussian Mixture Model for CAN physical layer detection can lead to a simplified process. The goal of CAN physical layer detection can be to identify the true source of a transmission on the bus. There can be an equal chance that a message can come from any node in the network, even though during normal operation some ECUs can send more messages than others. Assigning weights to each node in the network may increase frame accuracy during normal calculation, but in the event of an attack, could bias detection to misclassify a message. Therefore for the CAN physical layer identification the weights associated with each distribution should be equal to $w_i=1$, i=1 ... M.

In an unsupervised learning situation, a Gaussian Mixture Model based classifier can use an Expectation Maximization (EM) algorithm in order to calculate the μi and Σi for each component, or class within the distribution. As discussed above, the classifiers can be trained from known sources. Therefore, instead of using the EM approach to find the distributions for each ECU in the network, the center and the covariance can be calculated using edges from known ECUs. Calculating the center for each of the ECUs in the network can use a simple average operation. There are three options for calculating the covariance matrix Σi for each ECU depending on how the data is distributed, as described below.

The three options for calculating a covariance matrix are full, diagonal, and spherical. Full covariance matrices best describe data with correlations between features. A full covariance calculates covariance between every two features in a dataset. Unfortunately, full covariances lead to computationally complex models with a large number of parameters for each component of the distribution. For a N-dimensionality dataset, the covariance matrix is N×N. A 4×4 full covariance matrix is shown in Equation 7 below.

$$\sum = \begin{bmatrix} \sigma_1^2 & cov(x_1, x_2) & cov(x_1, x_3) & cov(x_1, x_4) \\ cov(x_2, x_1) & \sigma_2^2 & cov(x_2, x_3) & cov(x_2, x_4) \\ cov(x_3, x_1) & cov(x_1, x_2) & \sigma_3^2 & cov(x_2, x_4) \\ cov(x_4, x_1) & cov(x_1, x_2) & cov(x_2, x_3) & \sigma_4^2 \end{bmatrix} \quad \text{Equation (7)}$$

Diagonal covariance matrices can provide a slightly lesser computation overhead as all values off the diagonal are zero. The values on the diagonal can represent the standard deviation of all features within a dataset. Diagonal covariance matrices can work best when each dimension in a dataset is independent, as it assumes there is no correlation between dimensions in the dataset. A 4×4 diagonal covariance matrix is shown in Equation 8 below.

$$\sum = \begin{bmatrix} \sigma_1^2 & 0 & 0 & 0 \\ 0 & \sigma_2^2 & 0 & 0 \\ 0 & 0 & \sigma_3^2 & 0 \\ 0 & 0 & 0 & \sigma_4^2 \end{bmatrix} \quad \text{Equation (8)}$$

Spherical covariances can be defined as Σ=λI, where λ is a scalar value. Spherical covariances work best for data where each dimension in the data has a similar variance. Since this type of covariance can be realized as a single scalar multiplication can be the simplest computationally. It works best when all components in a dataset have similar variances and are independent. A spherical covariance is shown in Equation 9.

$$\sum = \begin{bmatrix} \lambda & 0 & 0 & 0 \\ 0 & \lambda & 0 & 0 \\ 0 & 0 & \lambda & 0 \\ 0 & 0 & 0 & \lambda \end{bmatrix} \quad \text{Equation (9)}$$

Each type of covariance can provide a different level of computation complexity and applicability to different datatypes. Full covariance is the most computationally complex, but it is able to model correlations between dimensions within a dataset. Diagonal covariance is more computationally efficient while providing a medium level of performance. Spherical covariance is the most computationally simple approach, while providing the least flexibility in the distributions of the data.

The density function for the GMM calculates the probability a sample came from a given distribution given a description of that distribution, a center M and a covariance matrix Σi. The density function is shown in Equation 10 below.

$$g(x|\mu_i, \Sigma_i) = \exp(-\frac{1}{2}(x-\mu_i)^T \Sigma_i^{-1}(x-\mu_i)) \quad \text{Equation (10)}$$

In the context of OVA classification, the Nearest Neighbor algorithm can classify a data point as the nearest cluster center. In unsupervised clustering applications, the centers of each cluster can be determined by an Expectation Maximization algorithm. In the case of CAN physical layer detection however, with access to labeled training data, it is possible to calculate the center for each cluster with a simple averaging algorithm, exactly like the centers in the GMM. The Nearest Neighbor approach is thus a special case of the GMM that utilizes covariances equal to the identity matrix for each distribution. With the identity matrix in place of Σi, the distance to each center in K-Means is shown in Equation 11 below.

$$g(x|\mu_i) = (x-\mu_i)^T(x-\mu_i) \quad \text{Equation (11)}$$

Returning to the example of FIG. 8, once each edge transition has been classified using the techniques and methods described above, the process 800 can move to step 810 wherein a determination can made as to which ECU in the CAN was the likely source of the payload isolated at step 804. In one or more examples, at step 810, the process can look at the individual classifications made at step 808 of each edge isolated at step 806 and implement a simple majority voting algorithm that classifies the payload by finding out which ECU had the majority of edges classified as belonging to it at step 808. In one example, if a payload had 100 edge transitions isolated to it and 54 of those edges were classified as belonging to ECU A at step 808, while 46 of those edges were classified as belonging to ECU B at step 808, then at step 810, the device 524 could determine that ECU A was the likely source of the CAN payload extracted at step 804.

Once a likely source ECU has been identified at step 810, the process 800 can move to step 812 wherein the ECU identified at step 810 is compared against the arbitration ID collected at step 802. As discussed above, each ECU can transmit a unique set of arbitration IDs. In a masquerade attack, a malicious user may gain control of ECU A and begin transmitting CAN messages with arbitration IDs that try and fool the system into thinking that messages being transmitted by ECU A are actually coming from ECU B. However, at step 812, the arbitration ID collected at step 802 can be compared to the ECU identified at step 812 to authenticate a CAN transmission. If a transmission has an arbitration ID belonging to one ECU, but has the physical characteristics of another ECU, then there is a good likelihood that the message is not authentic and is instead a message generated by a malicious user. As discussed above, the device 524 can have a priori knowledge of which arbitration IDs belong to which ECU, by virtue of the classification process described above with respect to FIG. 6.

Thus, at step 814 if the arbitration ID and the ECU identified at step 810 belong to the same ECU, then the process can move to step 816 wherein the transmission is authenticated. However, if the arbitration ID extracted at step 802 does not match the ECU identified at step 810, then the process can move to step 818 wherein the system or a user of the system can be alerted to the possible inauthentic transmission.

Figure 9:
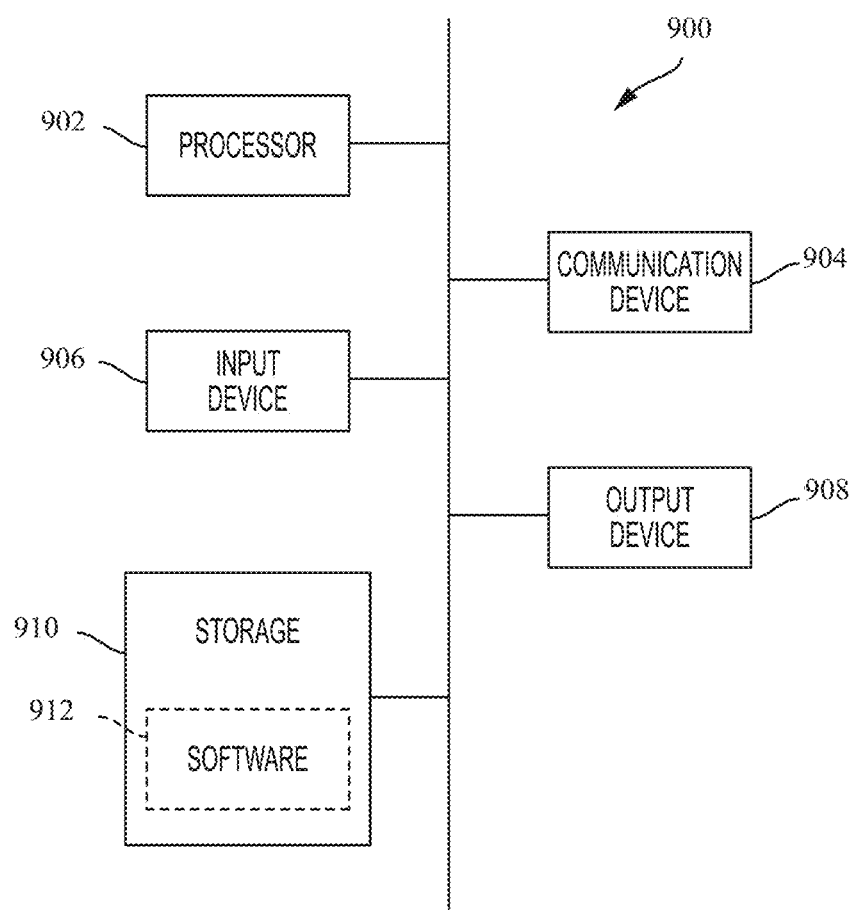
FIG. 9 illustrates an example of a computing device in accordance with one or more embodiments.

FIG. 9 illustrates an example of a computing device in accordance with one embodiment. Device 900 can be a host computer connected to a network. Device 900 can be a client computer or a server. As shown in FIG. 9, device 900 can be any suitable type of microprocessor-based device, such as a personal computer, work station, server, or handheld computing device (portable electronic device) such as a phone or tablet. The device can include, for example, one or more of processors 902, input device 906, output device 908, storage 910, and communication device 904. Input device 906 and output device 908 can generally correspond to those described above and can either be connectable or integrated with the computer.

Input device 906 can be any suitable device that provides input, such as a touchscreen, keyboard or keypad, mouse, or voice-recognition device. Output device 908 can be any suitable device that provides output, such as a touchscreen, haptics device, or speaker.

Storage 910 can be any suitable device that provides storage, such as an electrical, magnetic, or optical memory including a RAM, cache, hard drive, or removable storage disk. Communication device 904 can include any suitable device capable of transmitting and receiving signals over a network, such as a network interface chip or device. The components of the computer can be connected in any suitable manner, such as via a physical bus, or wirelessly.

Software 912, which can be stored in storage 910 and executed by processor 910, can include, for example, the programming that embodies the functionality of the present disclosure (e.g., as embodied in the devices described above).

Software 912 can also be stored and/or transported within any non-transitory, computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 910, that can contain or store programming for use by or in connection with an instruction-execution system, apparatus, or device.

Software 912 can also be propagated within any transport medium for use by or in connection with an instruction-execution system, apparatus, or device, such as those described above, that can fetch instructions associated with the software from the instruction-execution system, apparatus, or device and execute the instructions. In the context of this disclosure, a transport medium can be any medium that can communicate, propagate, or transport programming for use by or in connection with an instruction-execution system, apparatus, or device. The transport readable medium can include, but is not limited to, an electronic, magnetic, optical, electromagnetic, or infrared wired or wireless propagation medium.

Device 900 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 900 can implement any operating system suitable for operating on the network. Software 912 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

Therefore, according to the above, some examples of the disclosure are directed to a device for authenticating data transmissions in a network, the device comprising: a receiver configured to receive signal transmissions from a plurality of devices communicatively coupled to one another through the network, a memory, one or more processors, wherein the one or more processors are configured to execute instructions stored on the memory that when executed by the processor cause the device to: receive at the receiver a frame of data transmitted by a device of the plurality of devices, wherein the frame of data includes an identification portion and a payload portion, determine a first identity of the device based on the identification portion of the frame of data, extract and store in the memory one or more edge transitions contained within the payload portion of the frame of data, compare the one or more identified edge transitions contained within the payload portion of the frame of data with a plurality of average edge transition waveforms associated with each device of the plurality of devices, wherein each average edge transition waveform of the plurality of average edge transition waveforms corresponds to a device of the plurality of devices of the network, determine a second identity of the device based on the comparison between the one or more identified edge transitions contained within the payload portion of the frame of data and the plurality of average edge transition waveforms associated with each device of the plurality of devices, compare the determined first identity of the device with the determined second identity of the device, and determine the authenticity of the received frame of data based on the comparison between determined first identity of the device and the determined second identity of the device. Additionally or alternatively to one or more examples disclosed above, the processor is further caused to: determine that the frame of data is not authentic if the determined first identify of the device does not match with the determined second identity of the device. Additionally or alternatively to one or more examples disclosed above, extracting the one or more edge transitions contained within the payload portion of the frame of data comprises: identifying one or more edge transitions contained within the payload portion of the frame of data, storing in the memory a plurality of data samples associated with each identified edge contained within the payload portion of the frame of data, applying one or more signal processing techniques to each of the stored plurality of data samples associated with each identified edge, and storing in memory an output of the one or more signal processing techniques applied to each of the stored plurality of data samples associated with each identified edge. Additionally or alternatively to one or more examples disclosed above, the one or more signal processing techniques includes down sampling the plurality of data samples associated with each identified edge contained within the payload portion of the frame of data. Additionally or alternatively to one or more examples disclosed above, the one or more signal processing techniques includes applying an edge scaling process to the plurality of data samples associated with each identified edge contained within the payload portion of the frame of data. Additionally or alternatively to one or more examples disclosed above, the one or more signal processing techniques includes applying a differentiation algorithm to the plurality of data samples associated with each identified edge contained within the payload portion of the frame of data. Additionally or alternatively to one or more examples disclosed above, the one or more signal processing techniques includes taking the magnitude of the Fourier transform of the plurality of data samples associated with each identified edge contained within the payload portion of the frame of data. Additionally or alternatively to one or more examples disclosed above, comparing the one or more identified edge transitions contained within the payload portion of the frame of data with a plurality of average edge transition waveforms associated with each device of the plurality of devices includes comparing the output of the one or more signal processing techniques to the plurality of average edge transition waveforms associated with each device of the plurality of devices. Additionally or alternatively to one or more examples disclosed above, each of the plurality of average edge transition waveform is generated using a process comprising: receiving a training frame of data, wherein a the training frame data is associated with a known device of the plurality of devices, and wherein the training frame of data includes an identification portion and a payload portion, storing the identification portion of the training frame of data in memory, associating the identification portion of the training frame of data with the known device, extract and store in the memory one or more edge transitions contained within the payload portion of the training frame of data, and generating an average edge transition waveform based on the extracted and stored one or more edge transitions contained within the payload portion of the training frame of data. Additionally or alternatively to one or more examples disclosed above, comparing the one or more identified edge transitions contained within the payload portion of the frame of data with a plurality of average edge transition waveforms associated with each device of the plurality of devices includes determining a center waveform and a covariance for each device of the plurality of devices.

Other examples of the disclosure are directed to a method for authenticating data transmissions in a network, the method comprising: receiving at a receiver a frame of data transmitted by a device of the plurality of devices, wherein the frame of data includes an identification portion and a payload portion, and wherein the receive is configured to receive signal transmissions from a plurality of devices communicatively coupled to one another through the network, determining a first identity of the device based on the identification portion of the frame of data, extracting and storing in the memory one or more edge transitions contained within the payload portion of the frame of data, comparing the one or more identified edge transitions contained within the payload portion of the frame of data with a plurality of average edge transition waveforms associated with each device of the plurality of devices, wherein each average edge transition waveform of the plurality of average edge transition waveforms corresponds to a device of the plurality of devices of the network, determining a second identity of the device based on the comparison between the one or more identified edge transitions contained within the payload portion of the frame of data and the plurality of average edge transition waveforms associated with each device of the plurality of devices, comparing the determined first identity of the device with the determined second identity of the device, and determining the authenticity of the received frame of data based on the comparison between determined first identity of the device and the determined second identity of the device. Additionally or alternatively to one or more examples disclosed above, the method further comprises: determine that the frame of data is not authentic if the determined first identify of the device does not match with the determined second identity of the device. Additionally or alternatively to one or more examples disclosed above, extracting the one or more edge transitions contained within the payload portion of the frame of data comprises: identifying one or more edge transitions contained within the payload portion of the frame of data, storing in the memory a plurality of data samples associated with each identified edge contained within the payload portion of the frame of data, applying one or more signal processing techniques to each of the stored plurality of data samples associated with each identified edge, and storing in memory an output of the one or more signal processing techniques applied to each of the stored plurality of data samples associated with each identified edge. Additionally or alternatively to one or more examples disclosed above, the one or more signal processing techniques includes down sampling the plurality of data samples associated with each identified edge contained within the payload portion of the frame of data. Additionally or alternatively to one or more examples disclosed above, the one or more signal processing techniques includes applying an edge scaling process to the plurality of data samples associated with each identified edge contained within the payload portion of the frame of data. Additionally or alternatively to one or more examples disclosed above, the one or more signal processing techniques includes applying a differentiation algorithm to the plurality of data samples associated with each identified edge contained within the payload portion of the frame of data. Additionally or alternatively to one or more examples disclosed above, the one or more signal processing techniques includes taking the magnitude of the Fourier transform of the plurality of data samples associated with each identified edge contained within the payload portion of the frame of data. Additionally or alternatively to one or more examples disclosed above, comparing the one or more identified edge transitions contained within the payload portion of the frame of data with a plurality of average edge transition waveforms associated with each device of the plurality of devices includes comparing the output of the one or more signal processing techniques to the plurality of average edge transition waveforms associated with each device of the plurality of devices. Additionally or alternatively to one or more examples disclosed above, each of the plurality of average edge transition waveform is generated using a process comprising: receiving a training frame of data, wherein a the training frame data is associated with a known device of the plurality of devices, and wherein the training frame of data includes an identification portion and a payload portion, storing the identification portion of the training frame of data in memory, associating the identification portion of the training frame of data with the known device, extract and store in the memory one or more edge transitions contained within the payload portion of the training frame of data, and generating an average edge transition waveform based on the extracted and stored one or more edge transitions contained within the payload portion of the training frame of data. Additionally or alternatively to one or more examples disclosed above, comparing the one or more identified edge transitions contained within the payload portion of the frame of data with a plurality of average edge transition waveforms associated with each device of the plurality of devices includes determining a center waveform and a covariance for each device of the plurality of devices.

Other examples of the disclosure are directed to a non-transitory computer readable storage medium storing one or more programs, the one or more programs comprising instructions, which when executed by an electronic device with one or more processors and memory, cause the device to: receive at a receiver a frame of data transmitted by a device of the plurality of devices, wherein the frame of data includes an identification portion and a payload portion, and wherein the receive is configured to receive signal transmissions from a plurality of devices communicatively coupled to one another through the network, determine a first identity of the device based on the identification portion of the frame of data, extract and store in the memory one or more edge transitions contained within the payload portion of the frame of data, compare the one or more identified edge transitions contained within the payload portion of the frame of data with a plurality of average edge transition waveforms associated with each device of the plurality of devices, wherein each average edge transition waveform of the plurality of average edge transition waveforms corresponds to a device of the plurality of devices of the network, determine a second identity of the device based on the comparison between the one or more identified edge transitions contained within the payload portion of the frame of data and the plurality of average edge transition waveforms associated with each device of the plurality of devices, compare the determined first identity of the device with the determined second identity of the device, and determine the authenticity of the received frame of data based on the comparison between determined first identity of the device and the determined second identity of the device. Additionally or alternatively to one or more examples disclosed above, the device is further caused to: determine that the frame of data is not authentic if the determined first identify of the device does not match with the determined second identity of the device. Additionally or alternatively to one or more examples disclosed above, extracting the one or more edge transitions contained within the payload portion of the frame of data comprises: identifying one or more edge transitions contained within the payload portion of the frame of data, storing in the memory a plurality of data samples associated with each identified edge contained within the payload portion of the frame of data, applying one or more signal processing techniques to each of the stored plurality of data samples associated with each identified edge, and storing in memory an output of the one or more signal processing techniques applied to each of the stored plurality of data samples associated with each identified edge. Additionally or alternatively to one or more examples disclosed above, the one or more signal processing techniques includes down sampling the plurality of data samples associated with each identified edge contained within the payload portion of the frame of data. Additionally or alternatively to one or more examples disclosed above, the one or more signal processing techniques includes applying an edge scaling process to the plurality of data samples associated with each identified edge contained within the payload portion of the frame of data. Additionally or alternatively to one or more examples disclosed above, the one or more signal processing techniques includes applying a differentiation algorithm to the plurality of data samples associated with each identified edge contained within the payload portion of the frame of data. Additionally or alternatively to one or more examples disclosed above, the one or more signal processing techniques includes taking the magnitude of the Fourier transform of the plurality of data samples associated with each identified edge contained within the payload portion of the frame of data. Additionally or alternatively to one or more examples disclosed above, comparing the one or more identified edge transitions contained within the payload portion of the frame of data with a plurality of average edge transition waveforms associated with each device of the plurality of devices includes comparing the output of the one or more signal processing techniques to the plurality of average edge transition waveforms associated with each device of the plurality of devices. Additionally or alternatively to one or more examples disclosed above, each of the plurality of average edge transition waveform is generated using a process comprising: receiving a training frame of data, wherein a the training frame data is associated with a known device of the plurality of devices, and wherein the training frame of data includes an identification portion and a payload portion, storing the identification portion of the training frame of data in memory, associating the identification portion of the training frame of data with the known device, extract and store in the memory one or more edge transitions contained within the payload portion of the training frame of data, and generating an average edge transition waveform based on the extracted and stored one or more edge transitions contained within the payload portion of the training frame of data. Additionally or alternatively to one or more examples disclosed above, comparing the one or more identified edge transitions contained within the payload portion of the frame of data with a plurality of average edge transition waveforms associated with each device of the plurality of devices includes determining a center waveform and a covariance for each device of the plurality of devices.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the present disclosure as described herein.

The foregoing description sets forth exemplary methods, systems, techniques, parameters and the like. It should be recognized, however, that such description is not intended as a limitation on the scope of the present disclosure but is instead provided as a description of exemplary embodiments. The illustrative embodiments described above are not intended to be exhaustive or to limit the disclosure to the precise forms disclosed. Many modifications and variations are possible in view of the above teachings. The embodiments were chosen and described to best explain the principles of the disclosed techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. In the foregoing description of the disclosure and embodiments, reference is made to the accompanying drawings, in which are shown, by way of illustration, specific embodiments that can be practiced. It is to be understood that other embodiments and examples can be practiced, and changes can be made without departing from the scope of the present disclosure.

Although the foregoing description may use terms first, second, etc. to describe various elements, these elements should not be limited by the terms. These terms are only used to distinguish one element from another. For example, a first ECU could be termed a second ECU, and, similarly, a second ECU could be termed a first ECU, without departing from the scope of the various described embodiments.

What is claimed is:

1. A device for authenticating data transmissions in a controller area network, the device comprising:
   a receiver configured to receive signal transmissions from a plurality of devices communicatively coupled to one another through the network;
   a memory;
   one or more processors, wherein the one or more processors are configured to execute instructions stored on the memory that when executed by the processor cause the device to:
      receive at the receiver a frame of data transmitted by a device of the plurality of devices, wherein the frame of data includes an identification portion and a payload portion;
      determine a first identity of the device based on the identification portion of the frame of data;
      extract and store in the memory one or more edge transitions contained within the payload portion of the frame of data;
      compare the one or more identified edge transitions contained within the payload portion of the frame of data with a plurality of average edge transition waveforms associated with each device of the plurality of devices, wherein each average edge transition waveform of the plurality of average edge transition waveforms corresponds to a device of the plurality of devices of the network;
      determine a second identity of the device based on the comparison between the one or more identified edge transitions contained within the payload portion of the frame of data and the plurality of average edge transition waveforms associated with each device of the plurality of devices;
      compare the determined first identity of the device with the determined second identity of the device; and
      determine the authenticity of the received frame of data based on the comparison between determined first identity of the device and the determined second identity of the device.

2. The device of claim 1, wherein the processor is further caused to:
   determine that the frame of data is not authentic if the determined first identify of the device does not match with the determined second identity of the device.

3. The device of claim 1, wherein extracting the one or more edge transitions contained within the payload portion of the frame of data comprises:
   identifying one or more edge transitions contained within the payload portion of the frame of data;
   storing in the memory a plurality of data samples associated with each identified edge contained within the payload portion of the frame of data;
   applying one or more signal processing techniques to each of the stored plurality of data samples associated with each identified edge; and
   storing in memory an output of the one or more signal processing techniques applied to each of the stored plurality of data samples associated with each identified edge.

4. The device of claim 3, wherein the one or more signal processing techniques includes down sampling the plurality of data samples associated with each identified edge contained within the payload portion of the frame of data.

5. The device of claim 3, wherein the one or more signal processing techniques includes applying an edge scaling process to the plurality of data samples associated with each identified edge contained within the payload portion of the frame of data.

6. The device of claim 3, wherein the one or more signal processing techniques includes applying a differentiation algorithm to the plurality of data samples associated with each identified edge contained within the payload portion of the frame of data.

7. The device of claim 3, wherein the one or more signal processing techniques includes taking the magnitude of the Fourier transform of the plurality of data samples associated with each identified edge contained within the payload portion of the frame of data.

8. The device of claim 3, wherein comparing the one or more identified edge transitions contained within the payload portion of the frame of data with a plurality of average edge transition waveforms associated with each device of the plurality of devices includes comparing the output of the one or more signal processing techniques to the plurality of average edge transition waveforms associated with each device of the plurality of devices.

9. The device of claim 1, wherein each of the plurality of average edge transition waveform is generated using a process comprising:
   receiving a training frame of data, wherein a the training frame data is associated with a known device of the plurality of devices, and wherein the training frame of data includes an identification portion and a payload portion;
   storing the identification portion of the training frame of data in memory;
   associating the identification portion of the training frame of data with the known device;
   extract and store in the memory one or more edge transitions contained within the payload portion of the training frame of data; and
   generating an average edge transition waveform based on the extracted and stored one or more edge transitions contained within the payload portion of the training frame of data.

10. The device of claim 1, wherein comparing the one or more identified edge transitions contained within the payload portion of the frame of data with a plurality of average edge transition waveforms associated with each device of the plurality of devices includes determining a center waveform and a covariance for each device of the plurality of devices.

11. A method for authenticating data transmissions in a controller area network, the method comprising:
   receiving at a receiver a frame of data transmitted by a device of the plurality of devices, wherein the frame of data includes an identification portion and a payload portion, and wherein the receive is configured to receive signal transmissions from a plurality of devices communicatively coupled to one another through the network;

determining a first identity of the device based on the identification portion of the frame of data;

extracting and storing in the memory one or more edge transitions contained within the payload portion of the frame of data;

comparing the one or more identified edge transitions contained within the payload portion of the frame of data with a plurality of average edge transition waveforms associated with each device of the plurality of devices, wherein each average edge transition waveform of the plurality of average edge transition waveforms corresponds to a device of the plurality of devices of the network;

determining a second identity of the device based on the comparison between the one or more identified edge transitions contained within the payload portion of the frame of data and the plurality of average edge transition waveforms associated with each device of the plurality of devices;

comparing the determined first identity of the device with the determined second identity of the device; and determining the authenticity of the received frame of data based on the comparison between determined first identity of the device and the determined second identity of the device.

12. The method of claim 11, wherein the method further comprises:
   determining that the frame of data is not authentic if the determined first identify of the device does not match with the determined second identity of the device.

13. The method of claim 11, wherein extracting the one or more edge transitions contained within the payload portion of the frame of data comprises:
   identifying one or more edge transitions contained within the payload portion of the frame of data;
   storing in the memory a plurality of data samples associated with each identified edge contained within the payload portion of the frame of data;
   applying one or more signal processing techniques to each of the stored plurality of data samples associated with each identified edge; and
   storing in memory an output of the one or more signal processing techniques applied to each of the stored plurality of data samples associated with each identified edge.

14. The method of claim 13, wherein the one or more signal processing techniques includes down sampling the plurality of data samples associated with each identified edge contained within the payload portion of the frame of data.

15. The method of claim 13, wherein the one or more signal processing techniques includes applying an edge scaling process to the plurality of data samples associated with each identified edge contained within the payload portion of the frame of data.

16. The method of claim 13, wherein the one or more signal processing techniques includes applying a differentiation algorithm to the plurality of data samples associated with each identified edge contained within the payload portion of the frame of data.

17. The method of claim 13, wherein the one or more signal processing techniques includes taking the magnitude of the Fourier transform of the plurality of data samples associated with each identified edge contained within the payload portion of the frame of data.

18. The method of claim 13, wherein comparing the one or more identified edge transitions contained within the payload portion of the frame of data with a plurality of average edge transition waveforms associated with each device of the plurality of devices includes comparing the output of the one or more signal processing techniques to the plurality of average edge transition waveforms associated with each device of the plurality of devices.

19. The method of claim 11, wherein each of the plurality of average edge transition waveform is generated using a process comprising:
   receiving a training frame of data, wherein a the training frame data is associated with a known device of the plurality of devices, and wherein the training frame of data includes an identification portion and a payload portion;
   storing the identification portion of the training frame of data in memory;
   associating the identification portion of the training frame of data with the known device;
   extracting and store in the memory one or more edge transitions contained within the payload portion of the training frame of data; and
   generating an average edge transition waveform based on the extracted and stored one or more edge transitions contained within the payload portion of the training frame of data.

20. The method of claim 11, wherein comparing the one or more identified edge transitions contained within the payload portion of the frame of data with a plurality of average edge transition waveforms associated with each device of the plurality of devices includes determining a center waveform and a covariance for each device of the plurality of devices.

21. A non-transitory computer readable storage medium storing one or more programs, the one or more programs comprising instructions, which when executed by an electronic device with one or more processors and memory, caused the device to:
   receive at a receiver a frame of data transmitted by a device of the plurality of devices, wherein the frame of data includes an identification portion and a payload portion, and wherein the receive is configured to receive signal transmissions from a plurality of devices communicatively coupled to one another through a controller area network;
   determine a first identity of the device based on the identification portion of the frame of data;
   extract and storing in the memory one or more edge transitions contained within the payload portion of the frame of data;
   compare the one or more identified edge transitions contained within the payload portion of the frame of data with a plurality of average edge transition waveforms associated with each device of the plurality of devices, wherein each average edge transition waveform of the plurality of average edge transition waveforms corresponds to a device of the plurality of devices of the network;
   determine a second identity of the device based on the comparison between the one or more identified edge transitions contained within the payload portion of the frame of data and the plurality of average edge transition waveforms associated with each device of the plurality of devices;

compare the determined first identity of the device with the determined second identity of the device; and determine the authenticity of the received frame of data based on the comparison between determined first identity of the device and the determined second identity of the device.

22. The non-transitory computer readable storage medium of claim 21, wherein the device is further caused to:

determine that the frame of data is not authentic if the determined first identify of the device does not match with the determined second identity of the device.

23. The non-transitory computer readable storage medium of claim 21, wherein extracting the one or more edge transitions contained within the payload portion of the frame of data comprises:

identifying one or more edge transitions contained within the payload portion of the frame of data;

storing in the memory a plurality of data samples associated with each identified edge contained within the payload portion of the frame of data;

applying one or more signal processing techniques to each of the stored plurality of data samples associated with each identified edge; and storing in memory an output of the one or more signal processing techniques applied to each of the stored plurality of data samples associated with each identified edge.

24. The non-transitory computer readable storage medium of claim 23, wherein the one or more signal processing techniques includes down sampling the plurality of data samples associated with each identified edge contained within the payload portion of the frame of data.

25. The non-transitory computer readable storage medium of claim 23, wherein the one or more signal processing techniques includes applying an edge scaling process to the plurality of data samples associated with each identified edge contained within the payload portion of the frame of data.

26. The non-transitory computer readable storage medium of claim 23, wherein the one or more signal processing techniques includes applying a differentiation algorithm to the plurality of data samples associated with each identified edge contained within the payload portion of the frame of data.

27. The non-transitory computer readable storage medium of claim 23, wherein the one or more signal processing techniques includes taking the magnitude of the Fourier transform of the plurality of data samples associated with each identified edge contained within the payload portion of the frame of data.

28. The non-transitory computer readable storage medium of claim 23, wherein comparing the one or more identified edge transitions contained within the payload portion of the frame of data with a plurality of average edge transition waveforms associated with each device of the plurality of devices includes comparing the output of the one or more signal processing techniques to the plurality of average edge transition waveforms associated with each device of the plurality of devices.

29. The non-transitory computer readable storage medium of claim 21, wherein each of the plurality of average edge transition waveform is generated using a process comprising:

receiving a training frame of data, wherein a the training frame data is associated with a known device of the plurality of devices, and wherein the training frame of data includes an identification portion and a payload portion;

storing the identification portion of the training frame of data in memory;

associating the identification portion of the training frame of data with the known device;

extracting and store in the memory one or more edge transitions contained within the payload portion of the training frame of data; and generating an average edge transition waveform based on the extracted and stored one or more edge transitions contained within the payload portion of the training frame of data.

30. The non-transitory computer readable storage medium of claim 21, wherein comparing the one or more identified edge transitions contained within the payload portion of the frame of data with a plurality of average edge transition waveforms associated with each device of the plurality of devices includes determining a center waveform and a covariance for each device of the plurality of devices.

* * * * *